United States Patent
Cameron

(10) Patent No.: US 10,379,532 B2
(45) Date of Patent: Aug. 13, 2019

(54) WHEEL ASSEMBLY, A METHOD OF CONTROLLING THE MOTION OF AN OBJECT AND A GOLF CLUB STORAGE AND TRANSPORT DEVICE

(71) Applicant: Clark Anthony Cameron, Minto (AU)

(72) Inventor: Clark Anthony Cameron, Minto (AU)

( * ) Notice: Subject to any disclaimer, the term of this patent is extended or adjusted under 35 U.S.C. 154(b) by 117 days.

(21) Appl. No.: 15/546,269

(22) PCT Filed: Jan. 28, 2016

(86) PCT No.: PCT/AU2016/050042
§ 371 (c)(1),
(2) Date: Jul. 25, 2017

(87) PCT Pub. No.: WO2016/119015
PCT Pub. Date: Aug. 4, 2016

(65) Prior Publication Data
US 2017/0371331 A1    Dec. 28, 2017

(30) Foreign Application Priority Data

Jan. 28, 2015 (AU) .............................. 2015900229

(51) Int. Cl.
*G05D 1/00* (2006.01)
*B60K 7/00* (2006.01)
(Continued)

(52) U.S. Cl.
CPC ........... *G05D 1/0016* (2013.01); *A63B 55/30* (2015.10); *A63B 55/40* (2015.10); *A63B 55/61* (2015.10);
(Continued)

(58) Field of Classification Search
CPC .. G05D 1/0016; G05D 1/0274; G05D 1/0278; G05D 2201/0204; A63B 55/30;
(Continued)

(56) References Cited

U.S. PATENT DOCUMENTS

| | | | | |
|---|---|---|---|---|
| 3,179,195 A | * | 4/1965 | Bouladon | B60K 7/0007 180/10 |
| 3,897,843 A | * | 8/1975 | Hapeman | B60K 17/14 105/53 |

(Continued)

FOREIGN PATENT DOCUMENTS

| | | |
|---|---|---|
| CN | 2191013 Y | 3/1995 |
| DE | 3714066 A1 | 2/1988 |

(Continued)

OTHER PUBLICATIONS

International Search Report, PCT/AU2016/050042, Australian Patent Office, dated May 4, 2016.

(Continued)

*Primary Examiner* — Richard A Goldman
(74) *Attorney, Agent, or Firm* — Procopio Cory Hargreaves and Savitch LLP

(57) ABSTRACT

The wheel assembly includes an arm 51, a wheel 55, a power supply port 60, an electric motor 56 coupled to the wheel 55, and a motor controller 62 for controlling rotation of the electric motor 56. The method of controlling the motion of a motorized object includes defining a target position, sensing a current position of the motorized object and using an output from a processor to control the electric motors to drive the object toward the target position. The golf club storage and transport device 70 includes a body 71 for storing golf clubs and a pair of releasable wheels 75. The device 70 has an assembled configuration and a disassembled configuration.

8 Claims, 17 Drawing Sheets

(51) Int. Cl.

| | |
|---|---|
| *B60K 17/04* | (2006.01) |
| *A63B 55/30* | (2015.01) |
| *A63B 55/40* | (2015.01) |
| *B60K 1/02* | (2006.01) |
| *B60K 1/04* | (2019.01) |
| *B60K 17/14* | (2006.01) |
| *B60L 15/20* | (2006.01) |
| *G05D 1/02* | (2006.01) |
| *A63B 55/60* | (2015.01) |
| *B62B 5/00* | (2006.01) |
| *B60L 53/80* | (2019.01) |
| *F16H 7/02* | (2006.01) |
| *F16H 7/06* | (2006.01) |

(52) U.S. Cl.
CPC .......... *B60K 1/02* (2013.01); *B60K 1/04* (2013.01); *B60K 7/0007* (2013.01); *B60K 17/043* (2013.01); *B60K 17/14* (2013.01); *B60L 15/20* (2013.01); *B60L 53/80* (2019.02); *B62B 5/005* (2013.01); *B62B 5/0043* (2013.01); *B62B 5/0063* (2013.01); *B62B 5/0069* (2013.01); *G05D 1/0274* (2013.01); *G05D 1/0278* (2013.01); *A63B 2055/605* (2015.10); *A63B 2210/50* (2013.01); *B60K 2001/0461* (2013.01); *B60K 2007/0038* (2013.01); *B60K 2007/0061* (2013.01); *B60L 2240/423* (2013.01); *B60L 2240/461* (2013.01); *B60L 2240/622* (2013.01); *B60L 2250/16* (2013.01); *B60L 2250/22* (2013.01); *B60L 2250/30* (2013.01); *B60Y 2200/86* (2013.01); *B62B 2202/406* (2013.01); *B62B 2205/104* (2013.01); *F16H 7/023* (2013.01); *F16H 7/06* (2013.01); *G05D 2201/0204* (2013.01); *Y02T 10/7258* (2013.01)

(58) Field of Classification Search
CPC .......... A63B 55/40; A63B 55/61; B60K 1/02; B60K 1/04; B60K 7/0007; B60L 2220/44; B60L 2220/46; B60L 11/1822; B60L 15/20; B60L 2240/423; B60L 2240/461; B60L 2240/622; B60L 2250/16; B60L 2250/22; B60L 2250/30; G60K 7/0007; G60K 17/043; G60K 17/14; G60K 2001/0461; G60K 2001/0038; G60K 2001/0061; B62B 5/0043; B62B 5/005; B62B 5/0063; B62B 5/0069; B62B 2205/104; B60Y 2200/86; G16H 7/023; G16H 7/06; F16H 7/023; Y02T 10/7758
USPC ......... 701/2, 22; 180/65.51, 19.1; 280/47.26
See application file for complete search history.

(56) References Cited

U.S. PATENT DOCUMENTS

| | | | |
|---|---|---|---|
| 3,952,821 A | 4/1976 | Craven | |
| 4,063,612 A * | 12/1977 | Weiss | B62B 5/0026 180/12 |
| 5,236,055 A * | 8/1993 | Legal | A61G 5/043 180/65.51 |
| 5,818,134 A * | 10/1998 | Yang | B60K 7/0007 310/78 |
| 5,894,902 A * | 4/1999 | Cho | B60K 7/0007 180/65.51 |
| 5,944,132 A | 8/1999 | Davies et al. | |
| 5,947,855 A * | 9/1999 | Weiss | B60K 6/36 180/65.25 |
| 6,068,270 A * | 5/2000 | Kim | A63B 55/57 280/43.1 |
| 6,139,047 A * | 10/2000 | Kim | A63B 55/57 280/646 |
| 6,182,983 B1 * | 2/2001 | Kim | A63B 55/60 280/47.26 |
| 6,283,238 B1 * | 9/2001 | Royer | B62B 3/022 180/19.1 |
| 6,494,278 B1 * | 12/2002 | Weisz | A61G 5/045 180/65.51 |
| 6,851,496 B2 * | 2/2005 | Prucher | B60K 7/0007 180/65.1 |
| 6,863,141 B2 | 3/2005 | Weisz | |
| 7,100,722 B2 * | 9/2006 | Bowen | B60K 7/0007 180/65.51 |
| 7,789,175 B2 * | 9/2010 | Tobey | A61G 5/045 180/264 |
| 7,849,945 B2 * | 12/2010 | Ross, VII | B60G 3/20 180/197 |
| 8,096,378 B2 * | 1/2012 | Xie | B60K 7/0007 180/65.51 |
| 8,581,457 B2 * | 11/2013 | Takahashi | B60K 7/0007 180/65.51 |
| 8,764,030 B1 * | 7/2014 | Murphy | A63B 55/00 280/47.26 |
| 8,991,532 B2 * | 3/2015 | Wei | A61G 5/1032 180/65.51 |
| 9,085,302 B2 * | 7/2015 | Borroni-Bird | B62D 7/026 |
| 9,586,648 B2 * | 3/2017 | Marioni | H02K 7/14 |
| 9,789,929 B2 * | 10/2017 | Wu | B62M 6/55 |
| 10,065,451 B2 * | 9/2018 | Park | B60B 27/0021 |
| 2002/0125667 A1 * | 9/2002 | Sciulli | B62B 1/12 280/47.26 |
| 2003/0029646 A1 * | 2/2003 | Cassoni | B60R 9/08 180/19.1 |
| 2003/0029751 A1 * | 2/2003 | Boardman | A45C 5/14 206/315.4 |
| 2003/0132584 A1 * | 7/2003 | Borroni-Bird | B60G 3/18 280/5.5 |
| 2004/0035728 A1 * | 2/2004 | Ortega | A63B 55/30 206/315.3 |
| 2004/0200347 A1 * | 10/2004 | Grosch | B60G 7/02 89/1.11 |
| 2004/0232635 A1 * | 11/2004 | Cheldin | B62B 5/0026 280/47.26 |
| 2005/0087379 A1 * | 4/2005 | Holland | B62M 6/60 180/206.5 |
| 2006/0096793 A1 * | 5/2006 | Akagi | A61G 5/045 180/65.1 |
| 2006/0249920 A1 * | 11/2006 | Lambert | A63B 55/60 280/47.26 |
| 2007/0062774 A1 * | 3/2007 | Akagi | B60L 7/003 192/18 B |
| 2007/0096586 A1 * | 5/2007 | Cros | B60L 11/1803 310/216.059 |
| 2007/0181357 A1 * | 8/2007 | Saito | B60K 7/0007 180/65.51 |
| 2007/0257570 A1 * | 11/2007 | Walter | B60K 7/0007 310/67 R |
| 2007/0267234 A1 * | 11/2007 | Rogg | B60K 7/0007 180/65.51 |
| 2008/0196951 A1 * | 8/2008 | Gal | B62B 5/0026 180/65.1 |
| 2010/0250024 A1 | 9/2010 | Macedo et al. | |
| 2010/0294576 A1 * | 11/2010 | Wargh | B60K 7/0007 180/55 |
| 2011/0133542 A1 | 6/2011 | Ratti et al. | |
| 2011/0162896 A1 * | 7/2011 | Gillett | B60K 1/04 180/2.2 |
| 2011/0288707 A1 * | 11/2011 | Westlake | B60K 7/0007 701/22 |
| 2012/0061157 A1 * | 3/2012 | Whelan | A63B 55/00 180/54.1 |
| 2013/0139717 A1 * | 6/2013 | Smith | B60L 13/10 104/282 |

(56) References Cited

U.S. PATENT DOCUMENTS

| | | | | |
|---|---|---|---|---|
| 2014/0125021 A1* | 5/2014 | Du Toit | ................ | B62B 5/0033 |
| | | | | 280/47.34 |
| 2014/0246893 A1* | 9/2014 | Tesar | ................... | B60K 7/0007 |
| | | | | 301/6.5 |
| 2015/0266542 A1* | 9/2015 | Marioni | ................... | H02K 7/14 |
| | | | | 180/62 |
| 2016/0075225 A1* | 3/2016 | Aich | ................... | B60K 7/0007 |
| | | | | 180/206.6 |
| 2017/0210433 A1* | 7/2017 | Radenbaugh | .......... | B62D 51/02 |
| 2017/0371331 A1* | 12/2017 | Cameron | ............. | B60K 7/0007 |
| 2018/0280772 A1* | 10/2018 | Logan | ................... | A63B 55/30 |
| 2018/0370592 A1* | 12/2018 | Bui | ......................... | B62M 6/60 |

FOREIGN PATENT DOCUMENTS

| | | |
|---|---|---|
| DE | 4115649 D2 | 5/1991 |
| EP | 1350652 D1 | 3/2003 |
| GB | 2483048 A | 2/2012 |
| JP | 08300955 | 11/1996 |
| WO | 00/32462 | 6/2000 |
| WO | 2014057447 A2 | 4/2014 |
| WO | 2016037241 A1 | 3/2016 |

OTHER PUBLICATIONS

Written Opinion, PCT/AU2016/050042, Australian Patent Office, dated May 4, 2016.
Written Opinion, PCT/AU2016/050042, Australian Patent Office, dated Jan. 17, 2017.
Extended European Search Report for European patent application 16742582.6 dated Aug. 23, 2018 in 8 pages.

* cited by examiner

WHEEL ASSEMBLY, A METHOD OF CONTROLLING THE MOTION OF AN OBJECT AND A GOLF CLUB STORAGE AND TRANSPORT DEVICE

This application claims priority from Australian Provisional Patent Application No. 2015900229, dated 28 Jan. 2015, the contents of which are hereby incorporated in their entirety by way of reference.

TECHNICAL FIELD

The present invention relates to a wheel assembly, a method of controlling the motion of an object and a golf club storage and transport device. Embodiments of the present invention find application, though not exclusively, for use in, with, or as, a golf buggy.

BACKGROUND ART

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

In various contexts it is necessary to store a plurality of items and to transport them between or around a venue. Some non-limiting examples include the need to carry a plurality of golf clubs around a golf course, the need to transport a plurality of tools around a work site, and so on. Various wheeled vehicles, such as karts, buggies and barrows, have typically been used to assist in such situations. However, it has been appreciated by the inventor that it would be advantageous to provide new alternatives to assist in such situations. Additionally, it has been appreciated by the inventor that it would be advantageous to provide improved components to use in such devices, along with improved methods for controlling the motion of such objects.

SUMMARY OF THE INVENTION

It is an object of the present invention to overcome, or substantially ameliorate, one or more of the disadvantages of the prior art, or to provide a useful alternative.

In one aspect of the present invention there is provided a modular wheel assembly including: an arm defining a proximal end configured for attachment to an object and a distal end having an axel projecting therefrom; a wheel being rotatably mountable to the axel; a port for releasable connection of a power supply; an electric motor disposed upon the arm, the electric motor being driveably coupleable to the wheel; and a motor controller being configured so as to control rotation of the electric motor and to cause a rotational speed differential between the wheel and a wheel of a like modular wheel assembly so as to control the motion of an object to which the modular wheel assembly and the like modular wheel assembly are attached; wherein the modular wheel assembly is configured to function, in use, as a self-contained drive unit such that mechanical mounting of one or more of the modular wheel assemblies to an object may render the object mobile, without any requirement for the object to house any components associated with propulsion, power or control. Preferably the power supply is a rechargeable battery.

In one embodiment the motor controller is configured to receive and be responsive to control signals transmitted from a remote control unit. In another embodiment the motor controller is configured to receive and be responsive to positioning data.

Preferably at least one of the following driveably couples the electric motor to the wheel: a plurality of gears; a belt; or a chain.

Preferably the port is disposed on the electric motor such that the power supply is click-lockingly connectable to the electric motor.

In one embodiment a bracket mounts the electric motor to the arm. An embodiment further includes a decoupling mechanism for decoupling the electric motor from the wheel such that the wheel is free to rotate independently of the electric motor.

In a second aspect of the present invention there is provided a method of controlling the motion of a motorised object having at least a pair of wheels being independently drivable by respective electric motors, the method including the steps of: defining a target position; sensing a current position of the motorised object; and using an output from a processor to control the electric motors so as to drive the object toward the target position.

In one embodiment of the method the processor causes a rotational speed differential between the drivable wheels so as to control the direction of motion of the object. In this embodiment sensors respectively measure the rotational speed of each of the drivable wheels and communicate the measured rotational speeds to the processor as a part of a feedback control loop.

In another embodiment the processor causes a torque differential between the drivable wheels so as to control the direction of motion of the object. In this embodiment sensors respectively measure the torque applied to each of the wheels and communicate the measured torque to the processor as a part of a feedback control loop.

Preferably a current position of the motorised object is repeatedly sensed and communicated to the processor for processing as a part of a feedback control loop.

In one embodiment the target is defined with reference to a position sensed by a mobile device being carried by a person. In this embodiment the target is preferably defined as a position that is a first predefined distance from the position of the mobile device. Preferably, once the processor determines that the current position of the object is at or within the first predefined distance from the mobile device, the processor is configured to halt driving of the object until the distance between the current position of the object and the mobile device exceeds a second predefined distance, wherein the second predefined distance is greater than the first predefined distance.

In one embodiment the method is for use on a golf course hole and the processor has access to map data defining a fairway and a rough of the golf course hole and the output drives the object so as to maintain the object upon the fairway.

In another embodiment the target may be defined as a fixed position.

Preferably a sensor senses data associated with a direction in which the object is facing and communicates the data to the processor for use in determining the output.

In an embodiment the processor has access to route data defining a pathway, said target position being located on the pathway, and the processor is configured to provide an output that controls the electric motors so as to drive the object along the pathway to the target position.

In an embodiment the processor is responsive to user inputs defining a route along which the object is to be driven. In this embodiment the user inputs define a plurality of user selectable waypoints that together define the route.

Preferably the processor is responsive to user inputs so as to halt driving of the object.

In another aspect of the present invention there is provided a golf club storage and transport device including: a body sized to receive a plurality of golf clubs; and at least a pair of modular wheel assemblies, each being as described above and each being releasably attachable to the body; the device having an assembled configuration in which the modular wheel assemblies are attached externally of the body so as to support the body and a disassembled configuration in which the modular wheel assemblies are detached and are storable within, or upon, the body.

In one embodiment the arms of the modular wheel assemblies are each rotatably attachable to the body. Preferably each of the arms is rotatable between an extended position in which the distal end is spaced from the body and a retracted position in which the distal end is adjacent to the body. The golf club storage and transport device preferably includes at least one releasable lock or detent operable to retain at least one of the arms in the extended position.

The golf club storage and transport device preferably includes at least one freewheeling wheel rotatably attached to the body. Preferably an attachment formation attaching said freewheeling wheel to the body is configurable between an extendible position in which the freewheeling wheel is spaced from the body and a retracted position in which the freewheeling wheel is housed within, or adjacent to, the body.

Preferably the freewheeling wheel, whilst in the retracted position, protrudes from the body so as to rollingly engage with the ground when transporting the device whilst in the disassembled configuration.

Preferably the body defines an array of elongate storage compartments, each being sized so as to receive a handle and a shaft of a golf club such that a head of the golf club protrudes from the compartment. Preferably the array is either a 2×7 array or a 3×5 array.

In one embodiment a storage compartment is disposed on a lower portion of the body and the detached modular wheel assemblies are storable upon an upper portion of the body.

An embodiment of the golf club storage and transport device includes a braking mechanism for selectively applying a retardant force to at least one of the wheels.

An embodiment includes an antenna for receipt of control signals, the antenna being disposed on a top half of the device.

Preferably the device, when in the disassembled configuration, occupies a volume of less than 1250 mm×370 mm×400 mm.

The features and advantages of the present invention will become further apparent from the following detailed description of preferred embodiments, provided by way of example only, together with the accompanying drawings.

BRIEF DESCRIPTION OF THE ACCOMPANYING DRAWINGS

Figure 14A:
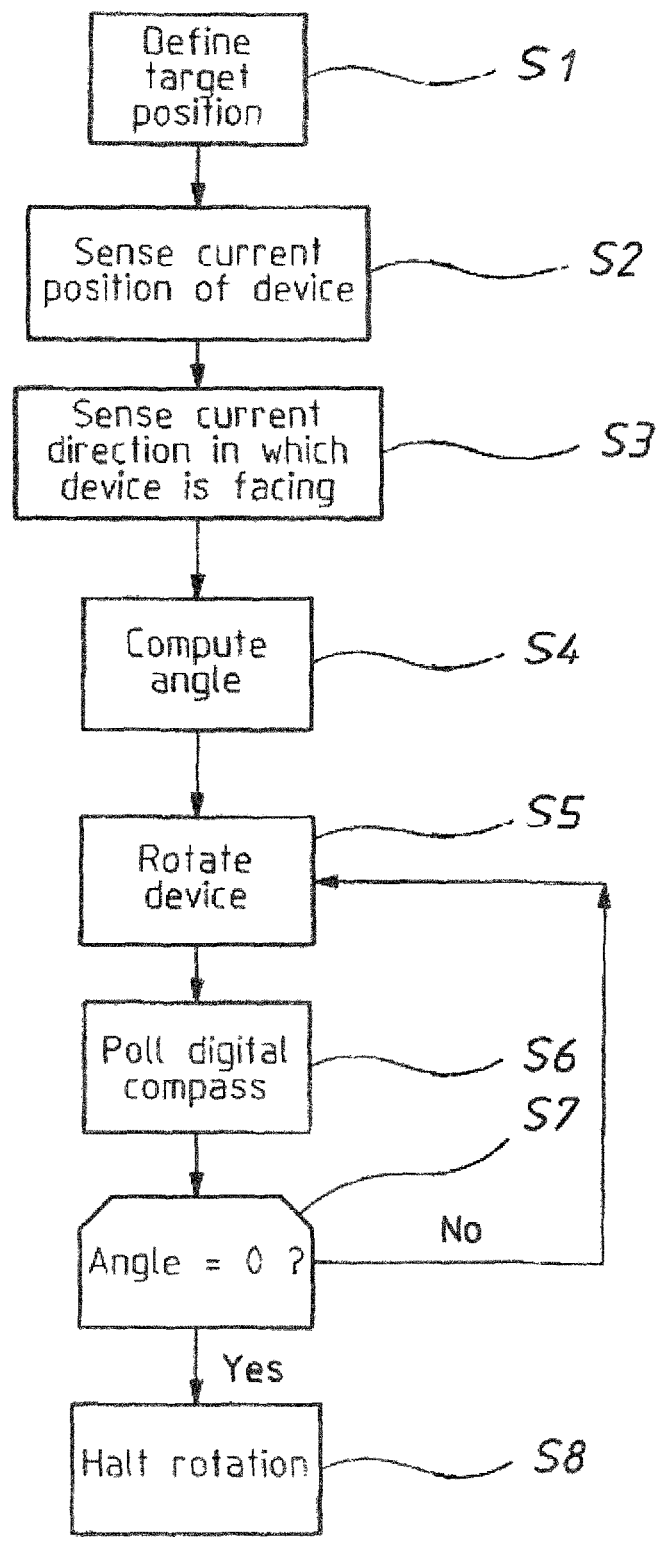
Figure 14B:
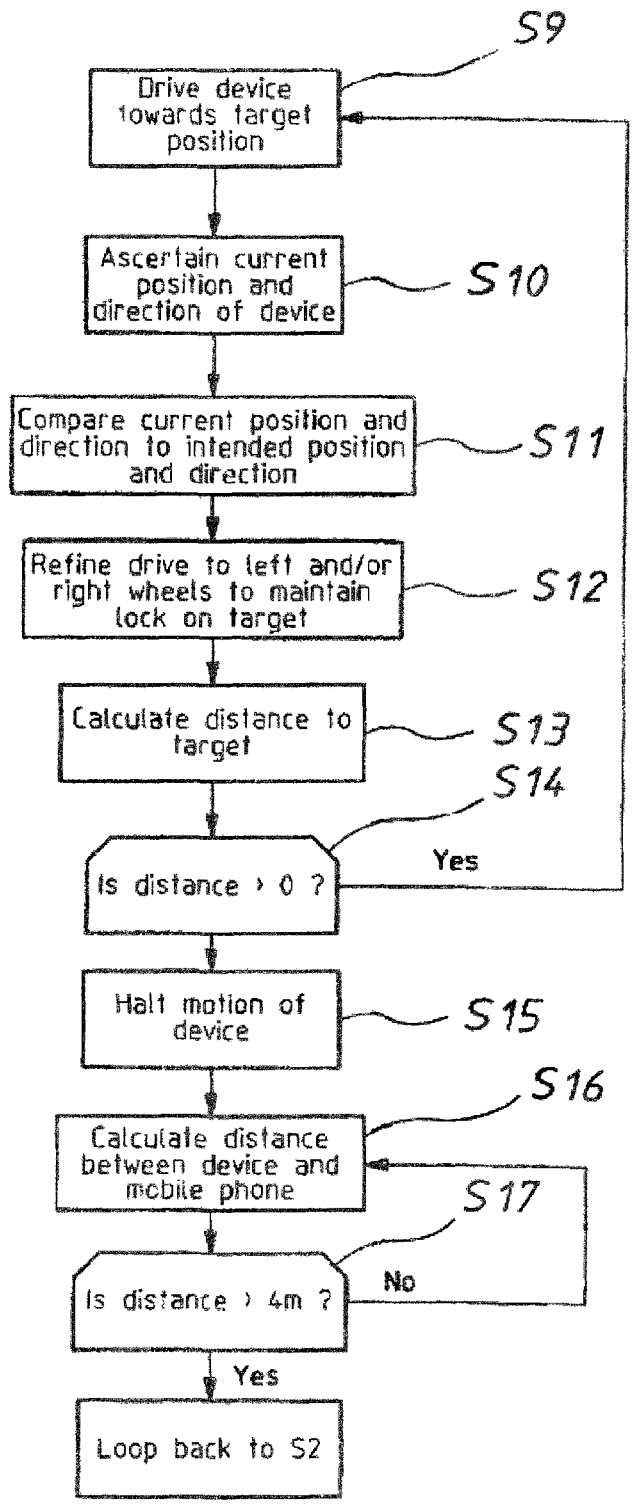

FIGS. 14A and 14B together constitute a flowchart showing the steps taken in a first embodiment of a method of controlling the motion of an autonomous motorised object; and FIGS. 15 to 18 are plan views of holes on a golf course.

DETAILED DESCRIPTION OF PREFERRED EMBODIMENTS OF THE INVENTION

Figure 1:
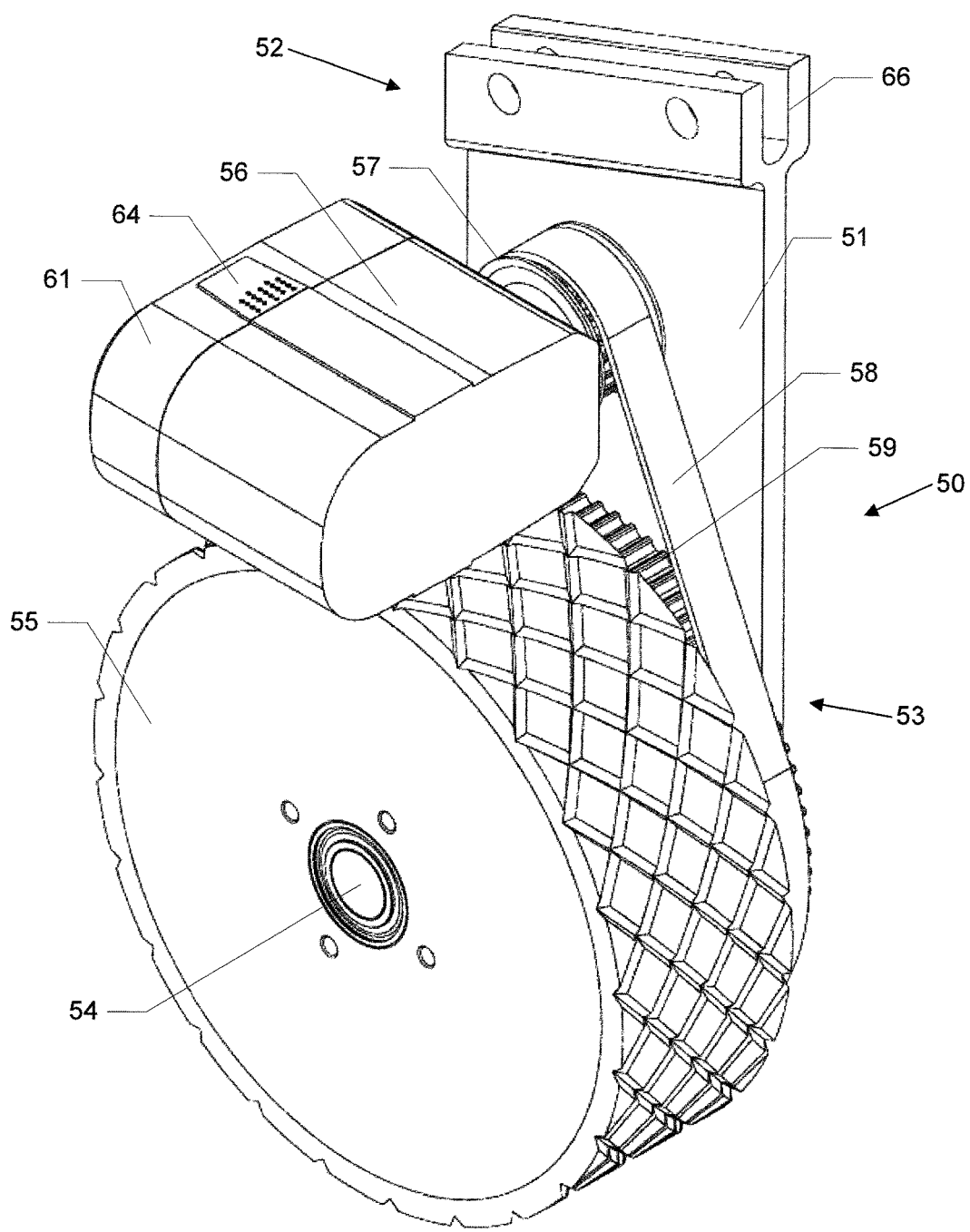
FIG. 1 is a perspective view of a wheel assembly according to an embodiment of the invention.
Figure 2:
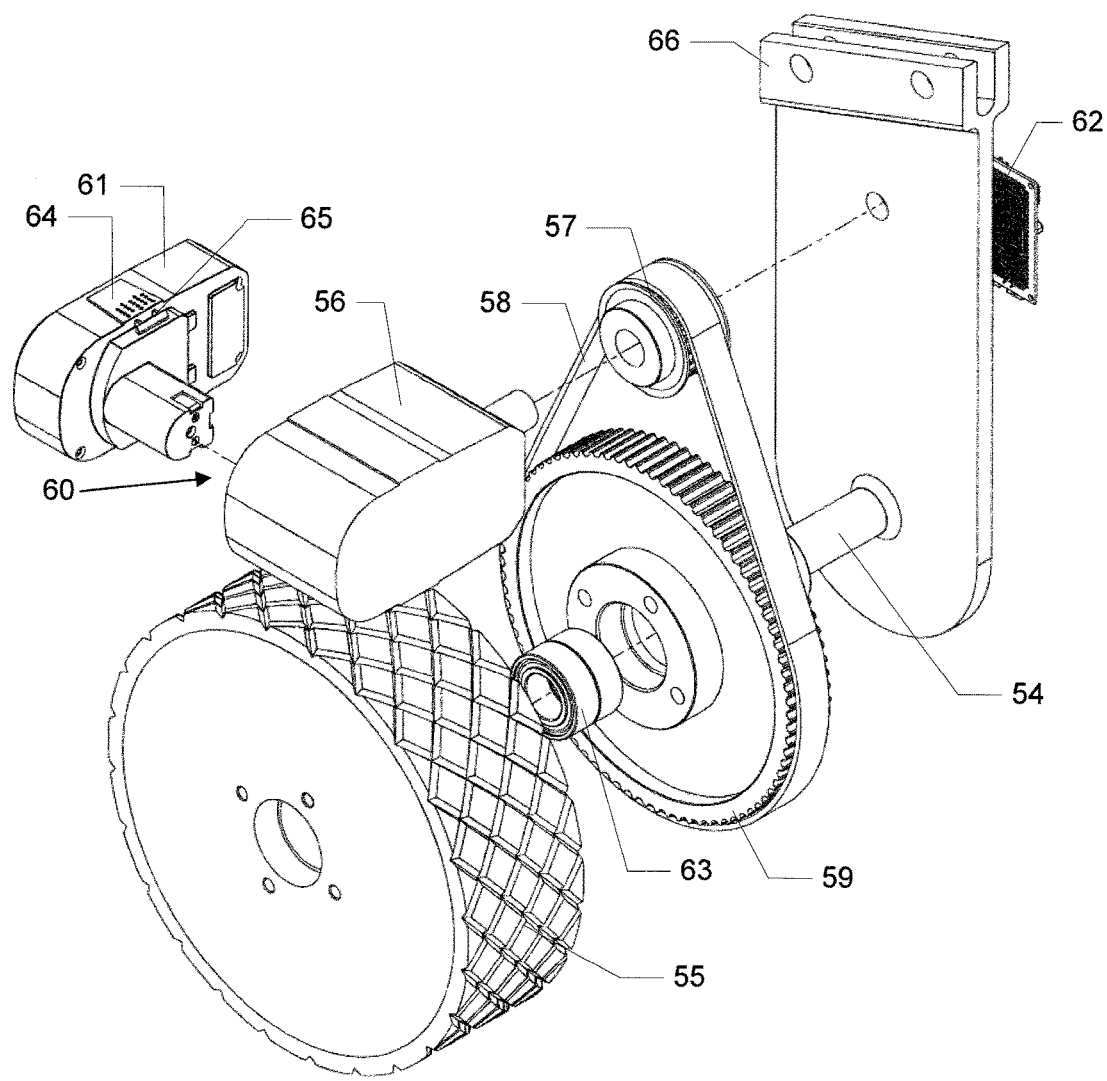
FIG. 2 is a perspective exploded view of the wheel assembly of FIG. 1.

FIGS. 1 and 2 depict an embodiment of a wheel assembly 50, which includes an arm 51 defining a proximal end 52 configured for attachment to an object and a distal end 53 having an axel 54 projecting therefrom. The arm 51 may be formed from a metallic plate, such as an aluminium plate for example.

A wheel 55 is mounted so as to rotate about the axel 54. The outer surface of the wheel 55 is treaded to assist the wheel to find traction when it is being driven on various surfaces.

An electric motor 56 is disposed upon the arm 51 so as to be being driveably coupled to the wheel 55. More particularly, a pulley 57 is rigidly mounted on the driveshaft 58 of the electric motor 56. The pulley 57 engages with a drive belt 58, which transmits rotational drive from the driveshaft-mounted pulley 57 to a wheel-mounted pulley 59 and ultimately to the wheel 55. The ratio of the diameter of the driveshaft-mounted pulley 57 to the diameter of the wheel-mounted pulley 59 is selected with so as to ensure that the wheel 55 exhibits desired rotational speed and torque characteristics when it is being driven by the electric motor 56. In the place of the belt 58, other embodiments make use of alternative drive coupling means, such as a chain and sprockets, a plurality of gears, etc.

As can be best seen in FIG. 2, the wheel-mounted pulley 59 is axially aligned with the wheel 55 and is secured to the side of the wheel 55 by four fasteners. Both the wheel 55, and the pulley 59, have apertures sized to receive respective roller bearings 63. These roller bearings each have an inner circumference that matches the circumference of the axel 54, which allows the wheel-mounted pulley 59 and the wheel 55 to rotate smoothly and efficiently on the axel 54.

The electric motor 56 is mounted to the arm 51 via a bracket (not illustrated), which extends from the arm 51, past the driveshaft-mounted pulley 57 and onto the electric motor 56. Additionally, the driveshaft of the electric motor 56 may extend beyond the driveshaft-mounted pulley 57 so as to be received within a roller bearing that is mounted in the arm 51. This helps maintain the driveshaft of the electric motor 56 in position so as to retain the desired alignment between the driveshaft-mounted pulley 57 and the wheel-mounted pulley 59.

A port 60 is disposed on the wheel assembly 50 into which a power supply, such as a rechargeable battery 61 for example, may be releasably connected. This port may be located anywhere that is convenient upon the wheel assembly 50, however in the preferred embodiment the port 60 is integrated into the electric motor 56. This allows the battery 61 to click-lock directly into the electric motor 56. This mounting arrangement advantageously positions the battery 61 for easy user access when it is necessary to replace or recharge the battery 61. Removal of the battery 61 simply requires tabs 64 that are disposed on either side of the battery 61 to be squeezed together, which displaces a pair of latches 65 inwardly so as to disconnect the battery 61 from the port 60.

As best shown in the exploded view of FIG. 2, a motor controller 62 is disposed on the opposite side of the arm 51. The motor controller 62 is in the form of a printed circuit board having a digital microprocessor mounted thereon, which is configured so as to control rotation of the electric motor 56. Although not shown in the drawings, the motor controller 62 is covered by a thin plastic shroud so as to protect it from the elements. In some embodiments the motor controller 62 is configured to receive and be responsive to control signals transmitted from a remote control unit. In another embodiment the motor controller 62 is configured to receive and be responsive to positioning data. The techniques used for each of these control methodologies are discussed in greater detail below.

The wheel assembly 50 has a Y-shaped connector 66 which allows for mounting of the assembly 50 onto a corresponding member provided upon an object. The corresponding member has a thickness that matches the separation distance between the ends of the Y-shaped connector 66. The corresponding member also has a pair of holes that match the pairs of holes 67 on the Y-shaped connector 66. The corresponding member is positioned inside the Y-shaped connector 66 such that the holes are in alignment and then a pair of fasteners are placed through the holes and fastened so as to retain the wheel assembly 50 onto the object.

Advantageously, embodiments of the wheel assembly 50 may be constructed so as to be light in weight and to benefit from comparative mechanically simplicity. Additionally, the wheel assembly 50 is a modular unit that functions as a self-contained drive unit because it has a propulsion means (in the form of electric motor 16), a power source (in the form of rechargeable battery 61) and control circuitry (in the form of motor controller 62). Hence, the wheel assembly 50 only requires mechanical mounting to an object in a manner whereby the object remains otherwise generally undisturbed. That is, the object may be rendered mobile by the simple mechanical connection of one or more of the wheel assemblies 50, without any requirement for the object to house any components associated with propulsion, power or control.

FIGS. 3 to 10 depict a golf club storage and transport device 70 that makes use of a pair of the wheel assemblies that were described above. The device 70 has a body 71 sized to receive a plurality of golf clubs 72. The body 71 defines an array of elongate storage compartments, each being sized so as to receive a handle and a shaft of a golf club 72 such that a head of the golf club protrudes from the compartment. The array of the illustrated embodiment has two columns and 7 rows, which provides storage space for up to 14 golf clubs 72. However, other embodiments may use other array configurations, such as a 3×5 array or the like. A single larger elongate compartment 73 is provided adjacent to the 2×7 array, which is sized to receive an umbrella or the like.

A pair of the above-described wheel assemblies 74 together provide a pair of wheels 75 that are releasably attachable to the body 71. The releasable attachment occurs between the Y-shaped connectors 77 of the pair of wheel assemblies 74 and a pair of corresponding members 76 disposed on a side of the body 71 towards the base of the body 71. This releasable attachment occurs in the manner described in detail above.

Figure 3:
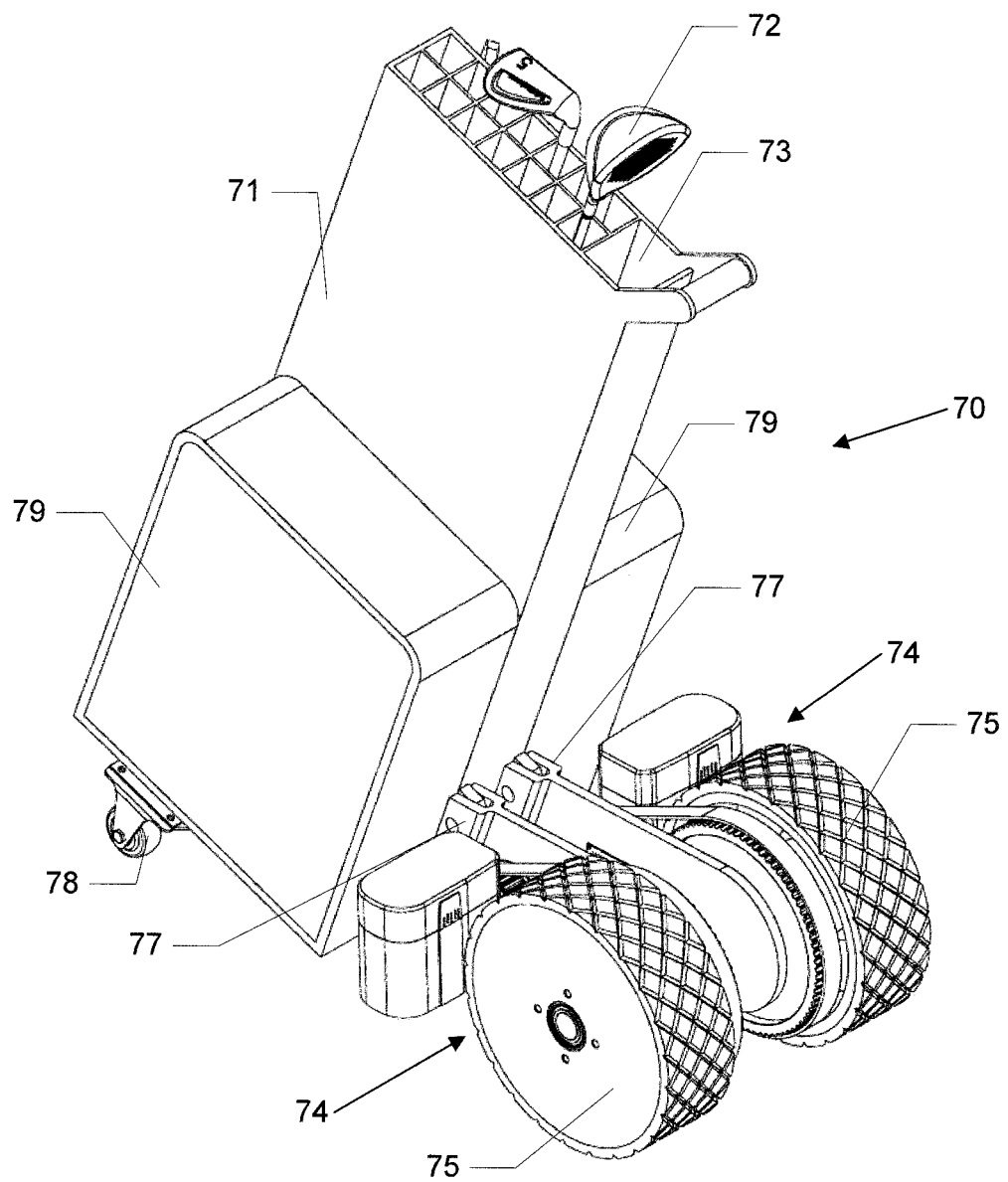
FIG. 3 is an upper-frontal perspective view of a golf club storage and transport device in the assembled configuration according to an embodiment of the invention.
Figure 4:
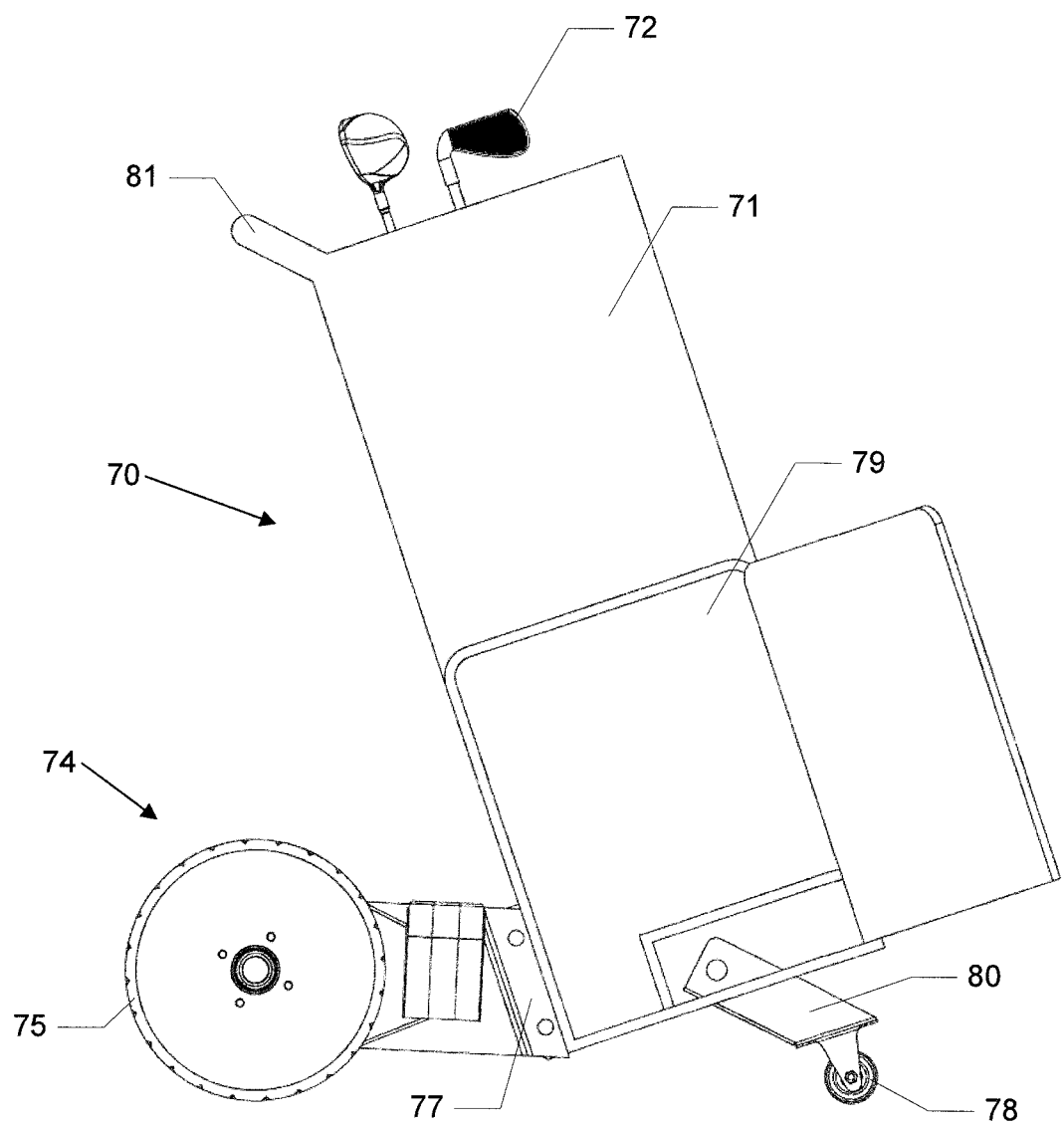
FIG. 4 is a left hand elevational view of the device of FIG. 3.
Figure 5:
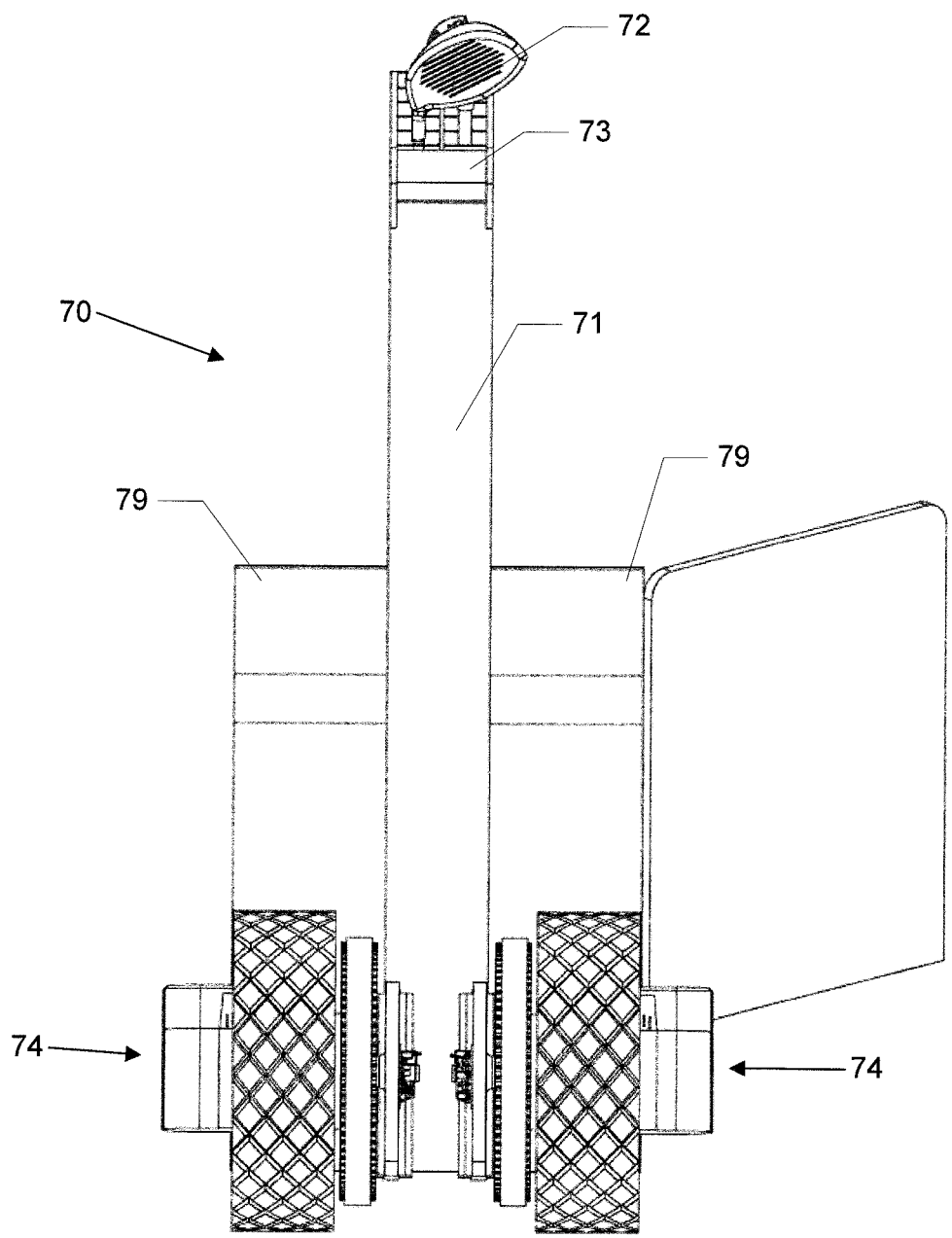
FIG. 5 is a front view of the device of FIG. 3.
Figure 6:
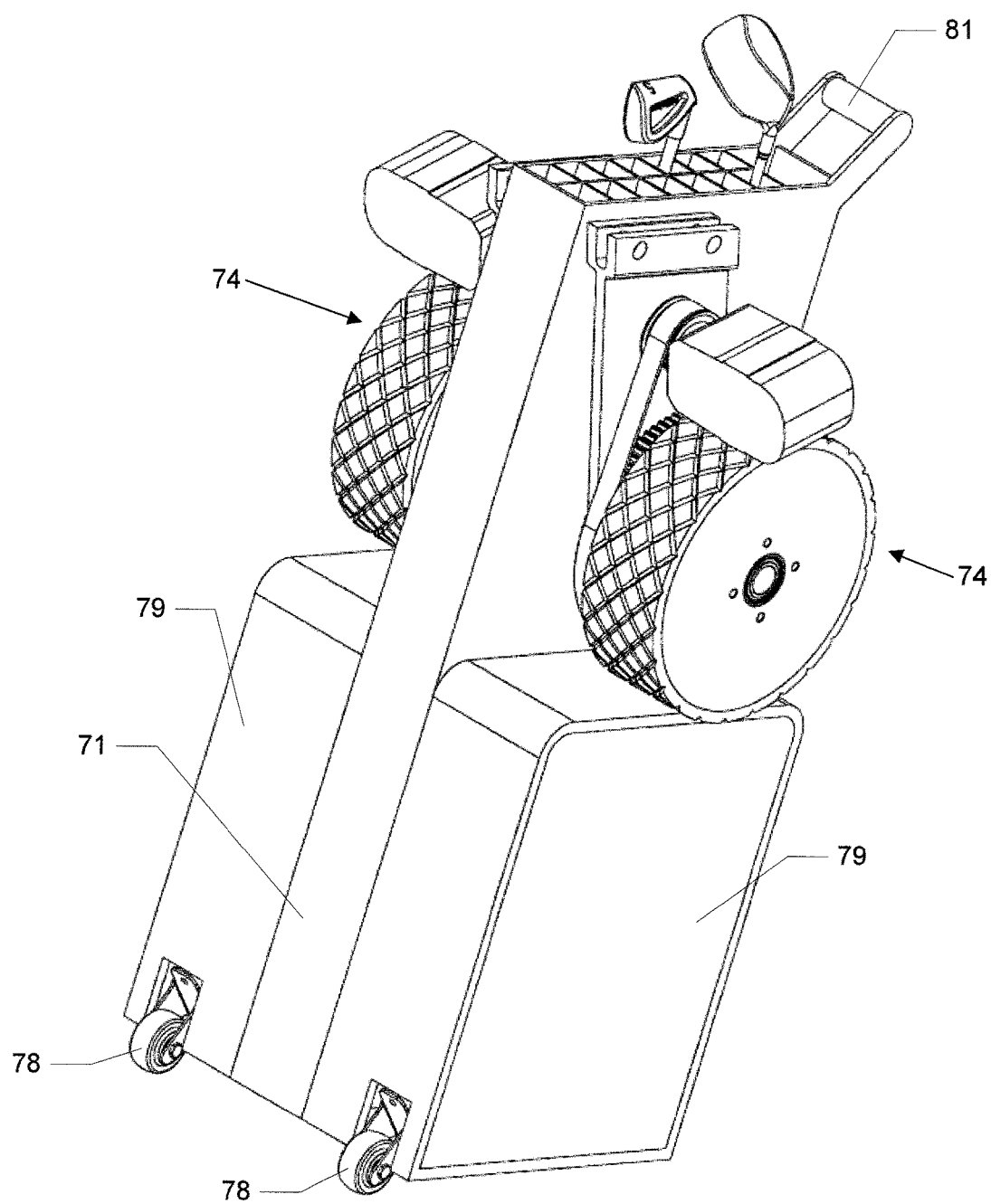
FIG. 6 is a is an upper-rearward perspective view of the device of FIG. 3 when in the disassembled configuration.
Figure 8:
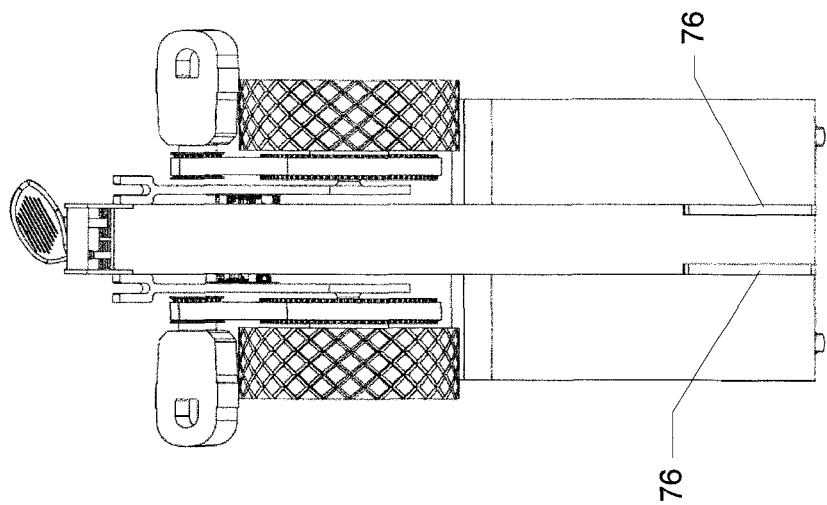
FIG. 8 is a front view of the device of FIG. 3 when in the disassembled configuration.
Figure 7:
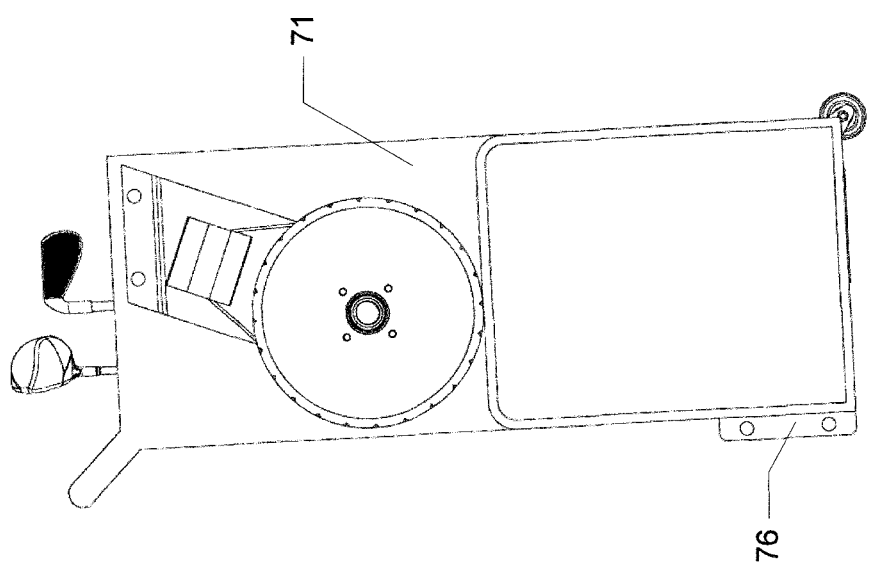
FIG. 7 is a left hand elevational view of the device of FIG. 3 when in the disassembled configuration.

As best illustrated in FIGS. 3 to 5, the device 70 has an assembled configuration in which the wheels 75 are attached externally of the body 71 so as to support the body 71. In this configuration the device 70 rests upon a total of four wheels, two of which are the wheels 75 provided by the pair of wheel assemblies and the other two of which are freewheeling wheels 78, which are undriven wheels that are free to rotate in response to movement of the device 70. If the grip provided by the freewheeling wheels 78 is anticipated to be substantially less than the grip afforded by the driven wheels 75, then the axels of the freewheeling wheels 78 may be rigidly mounted such that the freewheeling wheels 78 always face in a straight-ahead direction, as illustrated. The freewheeling wheels 78 would then skid across the ground whenever the device 70 changes direction. However, in another embodiment, the axels of the freewheeling wheels 78 are rotatably mounted to the device, which allows the freewheeling wheels 78 to turn to face the direction of movement as the device 70 executes a turn.

Figure 10:
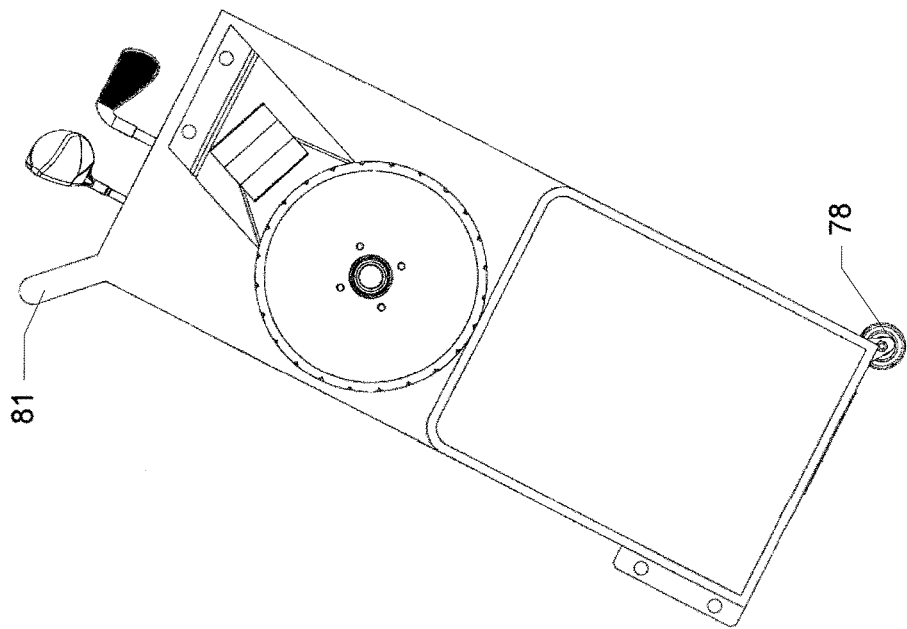
FIG. 10 is a is a left hand elevational view of the device of FIG. 3 when being transported whilst in the disassembled configuration.
Figure 9:
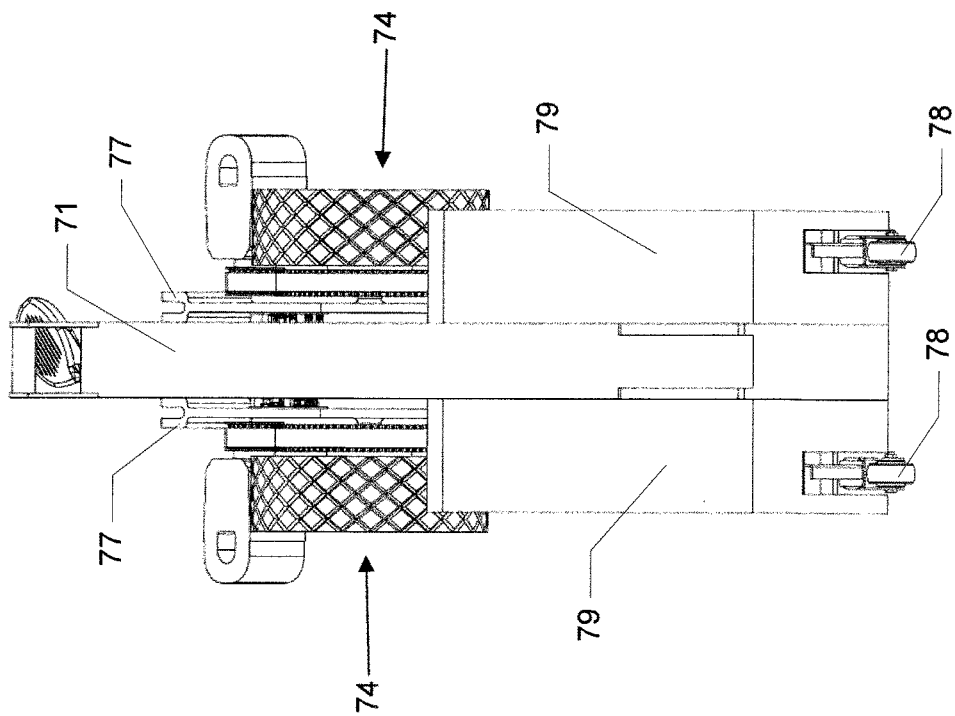
FIG. 9 is a rear view of the device of FIG. 3 when in the disassembled configuration.

The attachment formations, in the form of the arms 80, which attach the freewheeling wheels 78 to the body 71 can be configured so as to space the freewheeling wheels 78 from the body 71. More specifically, the arms 80 can be rotated such that their free ends, to which the freewheeling wheels 78 are attached, protrude below the base of the body 71, as best shown in FIG. 4. This provides the device 70 with increased ground clearance. However, as shown in FIGS. 6 to 10, the arms 80 can also be rotated into a retracted position in which the freewheeling wheels 78 are housed partially within the body 71. Advantageously, whilst in this retracted configuration, a portion of the freewheeling wheels 78 still protrude beyond the lower corner of the body 71, as shown for example in FIG. 7. This allows the device to be grasped by its handle 80 and manually transported whilst the freewheeling wheels 78 roll along the ground, as best shown in FIG. 10. This facilitates manual transportation of the device 70 whilst it is in the disassembled configuration.

As best illustrated in FIGS. 6 to 10, the device 70 has a disassembled configuration in which the driven wheels 75 are detached and are storable within, or upon, the body. More particularly, it is the entire wheel assemblies 74 that are detached and put into a storage position. One option is to store the wheel assemblies 74 respectively in the two storage compartments 79 that are disposed on either side of the lower portion of the body 71. However, as depicted in the illustration, another option is to attach the wheel assemblies 74 on either side of the upper portion of the body 71.

Whilst in the assembled configuration the positioning of the wheel assemblies 74 and the storage compartments 79 towards the bottom of the body 71 helps contribute to a low center of gravity, which helps to promote stability.

When in the disassembled configuration the device 70 occupies a volume that is similar to that occupied by a typical prior art golf bag that does not feature any motorised wheels. This volume is approximately half the volume occupied by a typical prior art golf bag having motorised wheels. From a quantitative perspective, the device 70, when in the disassembled configuration, occupies a volume of less than 1250 mm×370 mm×400 mm. Typically, the volume occupied by the disassembled device 70 is approximately 1200 mm in height by 350 mm in width by 380 mm in length.

The use of the pair of wheel assemblies 74 allows the device 70 to be have a comparatively narrow width (in the disassembled configuration) whilst providing an acceptably wide wheel track of approximately 320 mm to 400 mm (in the assembled configuration).

Figure 11:
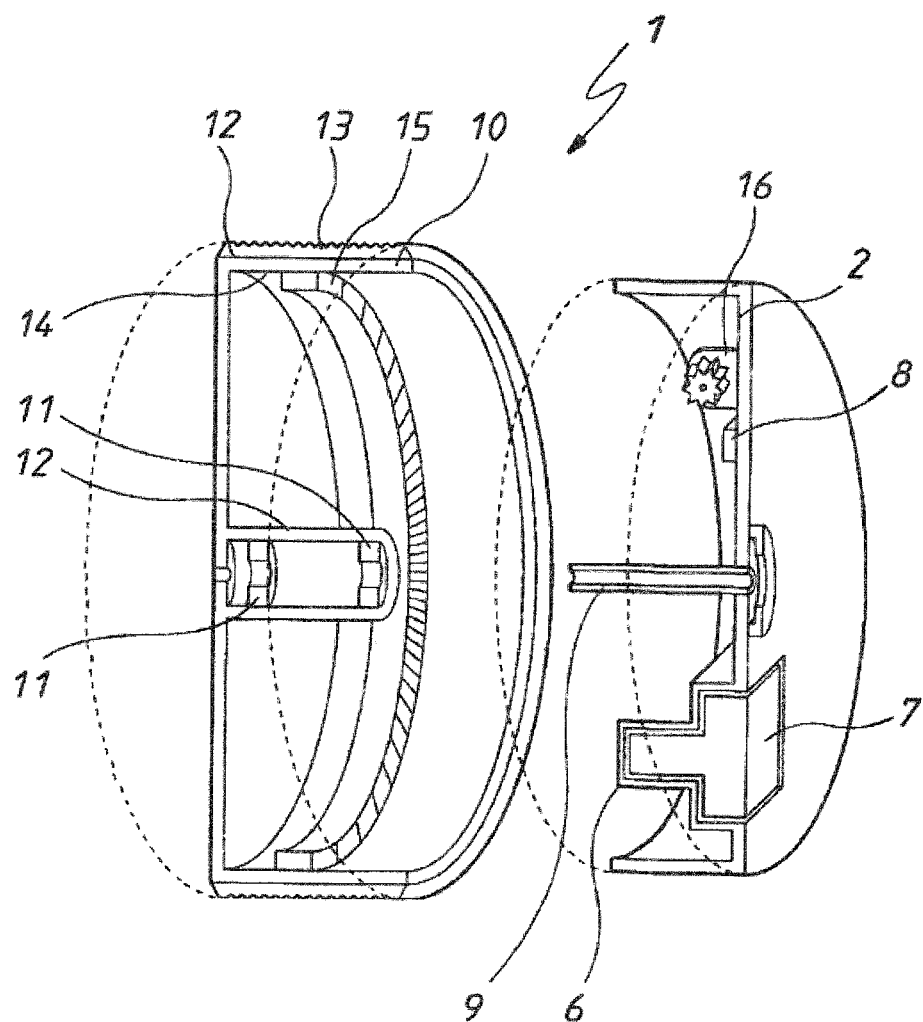
FIG. 11 is a partially disassembled view of a wheel according to an embodiment of the invention.

An alternative modular propulsion unit is illustrated in FIG. 11, which depicts a wheel 1 having a hub 2 that can be mounted to an object. The object may be anything that the user desires to render mobile. For example, the object may be the golf club storage and transport device 20 illustrated in FIGS. 12 and 13, or it may be another object such as a wheelchair, a piece of furniture, electrical equipment, garden wheelbarrow, shopping trolley, children's pram, etc.

In some preferred embodiments a bracket is used to mount the hub 2 to the object. The bracket has a fixing plate having three holes to allow fasteners, such as screws for example, to affix the bracket to the object. A lug extends from the plate to provide a formation to which the hub 2 may be affixed. In another embodiment, a pair of the wheels 1 is mountable to an assembly that is attachable to the object. However, in the embodiment illustrated in FIGS. 12 and 13, the hubs 2 of each of the wheels 1 is releasably attachable to an arm 4 that is rotatably attached to the body 5 of the golf club storage and transport device 3. Yet other embodiments feature more than two of the drivable wheels 1, for example four drivable wheels 1.

The hub 2 defines a port 6 for releasable connection of a power supply, which is in the form of a rechargeable battery 7. The rechargeable battery 7 may be a nickel-cadmium battery or preferably a more modern type of rechargeable battery having a better power to weight ratio, such as a lithium polymer battery or a lithium-ion battery. An embodiment of the invention makes use of batteries that are already commercially available for use with portable power tools. Preferably the rechargeable battery 7 weighs less than 3 kg and in the preferred embodiment, it weighs approximately 0.7 kg. The port 6 is sized so as to make an interference fit with the rechargeable battery 7 to thereby releasably mechanically connect the battery 7 to the hub 3. The mechanical connection also maintains an electrical connection between the terminals of the battery 7 and the electronic circuitry 8 that is mounted on the hub 2. When it is desired to recharge the battery, the user simply grasps the battery 7, pulls it out of the port 6, and then attaches the battery 7 to a recharging unit.

Centrally disposed on the hub 2 is an axel 9, to which a rim 10 is rotatably mountable. More specifically, a set of bearings 11 are housed within a boss 12 that is centrally disposed on the rim 10. Mating of the rim 10 to the hub 2 requires the axel 9 to be inserted into the bearings 11 and then a fastener, such as a circlip, screw, or the like, is used to retain the rim 10 onto the hub 2.

The rim 10 defines a circumferentially outer surface 12, upon which rubber tread 13 is disposed to help the outer surface 12 to grip the ground as the wheel 1 is driven. The rim 10 also defines a circumferentially inner surface 14, upon which a ring gear 15 is disposed.

An electric motor 16 is disposed upon the hub 2. The electric motor 16 is driveably coupled to the inner surface 14 by a plurality of gears that extend from the output shaft of the electric motor 16 so as to intermesh with ring gear 15. Hence, rotation of the electric motor 16 causes rotation of the rim 10. The overall gear ratio of the drive coupling is selected with regard to the maximum desired operational speed of the wheel 1 and the rotational speed and torque characteristics of the electric motor 16 and battery combination. For applications such as the golf club storage and transport device 3, the overall gear ratio is selected so as to provide a maximum operational wheel speed of between about 3 and 8 kilometers per hour. This approximately matches the typical human walking speed and, depending upon the specific electric motor 16 and battery 7 combination that is utilised, may provide for driving of the wheel 1 at relatively high torque levels.

The electronic circuitry 8 includes a motor controller being disposed upon the hub and being configured so as to control rotation of the electric motor 16. In an autonomous embodiment the electronic circuitry 8 also includes a microprocessor that provides an output signal to which the motor controller is responsive. In some embodiments the microprocessor is an integral part of the motor controller and in other embodiments the microprocessor is a separate component. In the autonomous embodiment the motor controller, or the motor controller when functioning in combination with the microprocessor, is configured to receive and be responsive to positioning data so as to control the wheel's motion in a manner that is described in more detail below. The electronic circuitry 8 also includes a number of components that are each accessible by the processor, including random access memory, communications hardware such as hardware to access a cellular data communications network and/or a WiFi link and/or a near field communications link such as Bluetooth, GPS positioning hardware, a rotational speed sensor and a digital compass.

In a remote controlled embodiment the electronic circuitry 8 includes a receiver for receiving control signals transmitted from a hand held remote control unit. In this embodiment the motor controller is configured to receive and be responsive to the control signals transmitted from a remote control unit. The control unit is a hand held transmitter having two parallel joysticks that allow for the control of a pair of wheels 1 that are disposed on the left and right sides of an object. When the operator of the control unit does not exert any force upon the joysticks they each remain in a resting position due to resilient biasing and, whilst in this position, the transmitter transmits a control signal indicating that no drive is required from either of the wheels 1. If the operator of the remote control unit pushes, say, the left joystick forward, then the transmitter transmits a control signal indicating that the left wheel 1 is to be driven forwards. In response to receipt of this control signal, the motor controller of the left hand wheel 1 provides an output to the electric motor 16 of the left hand wheel 1, which causes the left hand wheel 1 to be driven forwards. If the operator of the remote control unit pushes the left joystick backward, then the transmitter transmits a control signal indicating that backwards drive is required from left wheel 1. Similarly, the operator of the remote control unit pushes the right hand joystick forwards and backwards to control the rotation of the right hand wheel 1. The remote control unit makes use of proportional control, whereby the speed of rotation of the wheel 1 is proportional to the distance that the joystick is pushed from its resting position.

Another remote controlled embodiment makes use of an alternative control unit that dispenses with the above-mentioned joy sticks and instead makes use of user-operable buttons. This control unit has buttons for 'stop', 'forward' and 'reverse', along with some other buttons that will be described below. If the user presses the 'stop' button, then the control unit transmits a control signal that indicates to the circuitry controlling the device 70 that each of the wheels 75 are to remain stationary. If the user presses the 'forward' button, then the control unit transmits a control signal that indicates to the circuitry controlling the device that each of the wheels 75 are to be driven forwards at a standard speed of, say, 5 kph. If the user presses the 'reverse' button, then the control unit transmits a control signal that indicates to the circuitry controlling the device 70 that each of the wheels 75 are to be driven in reverse at the standard speed. Pressing the 'forward' or the 'reverse' buttons should cause the device to move forwards or backwards in a straight line.

The control unit also includes a 'plus' and a 'minus' button on the left hand side of the unit, which allows for incremental speed adjustment of the left hand driven wheel. Similar 'plus' and 'minus' buttons are on the right hand side of the control unit for incremental speed adjustment of the right hand wheel. These buttons are used to cause the device to turn to either side. If the device 70 is moving forwards at the standard speed (i.e. with both driven wheels 75 rotating at the same speed) and the user wishes to cause the device to turn to, say, the left hand side, the user can press the left hand 'minus' button, which will cause the control unit to transmit a signal that will cause the control circuitry of the device 70 to decrease the rotational speed of the left hand driven wheel by, say, 5%, resulting in the device 70 turning to the left. Another option would be to press the right hand 'plus' button, which would incrementally increase the rotational speed of the right hand driven wheel, once again resulting in the device 70 turning to the left. Hence, this control unit provides sufficient inputs to allow the user to control the motion of the device as required.

Advantageously, the wheel 1 is a modular unit that is self-sufficient in terms of motive force (because of the hub mounted electric motor 16), power (due to the hub mounted battery 7) and control (due to the hub mounted electronic circuitry). Hence, the wheel 1 only requires mechanical mounting to an object in a manner whereby the object remains otherwise undisturbed. More specifically, the object may be rendered mobile by the simple mechanical connection of some of the wheels 1, without any requirement for the object to house any components associated with motive force, power or control.

Some embodiments of the wheel 1 include a decoupling mechanism for decoupling the electric motor 16 from the inner surface 14. In one such embodiment the decoupling mechanism is operable to shift one of the gears of the drive coupling into and out of intermeshing engagement with another of the gears of the drive coupling. In another such embodiment, the decoupling mechanism is a clutch that engages and disengages the power transmission of the drive coupling. When the decoupling mechanism is operative, the wheel 1 is free to rotate independently of the electric motor 16. Hence, the decoupling mechanism may be utilised when it is desired to manually move the object without the assistance of, or the drag caused by, the motor 16.

Figure 12:
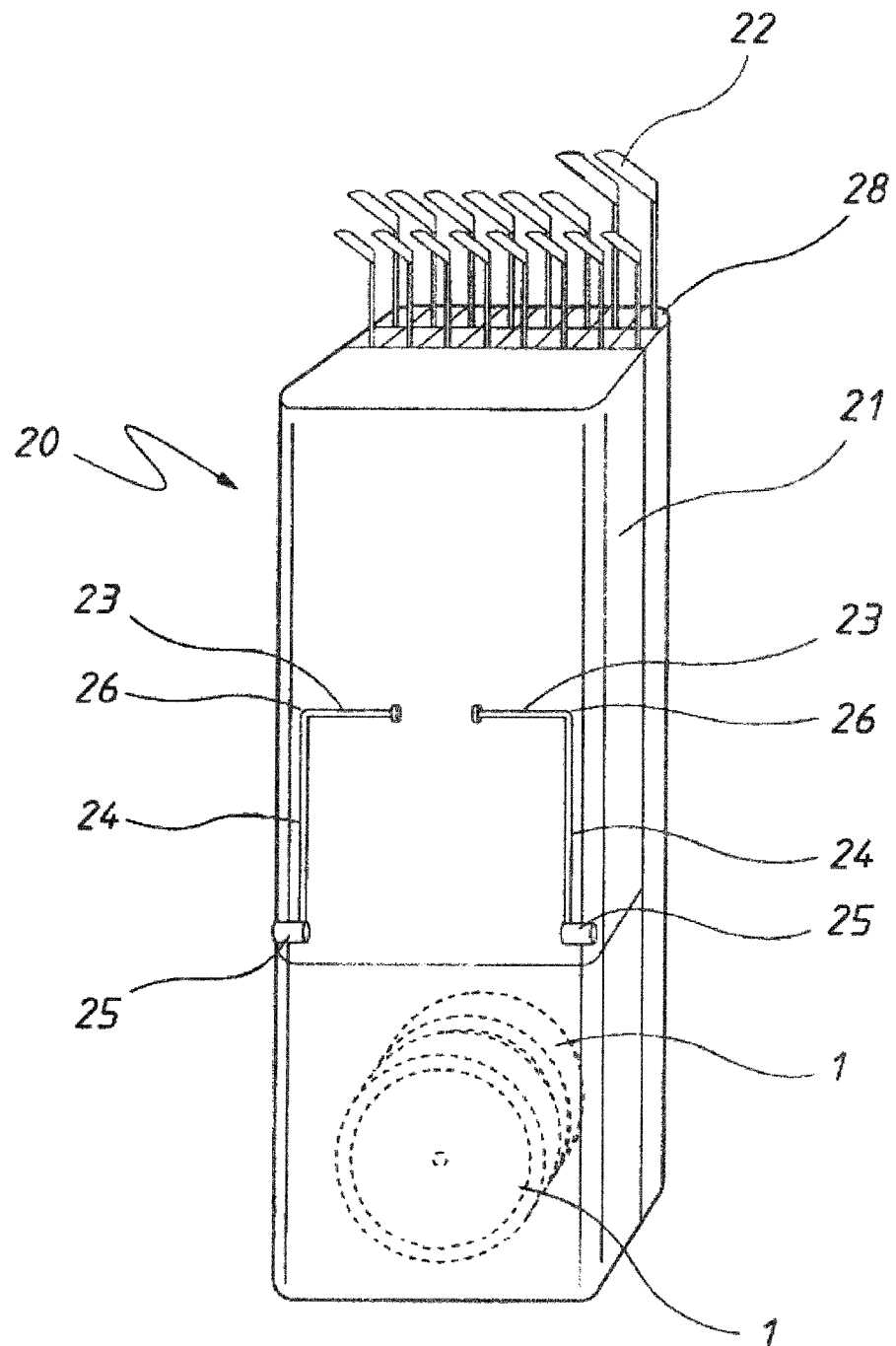
FIG. 12 is a perspective view of an embodiment of a golf club storage and transport device according to the invention in a disassembled configuration.
Figure 13:
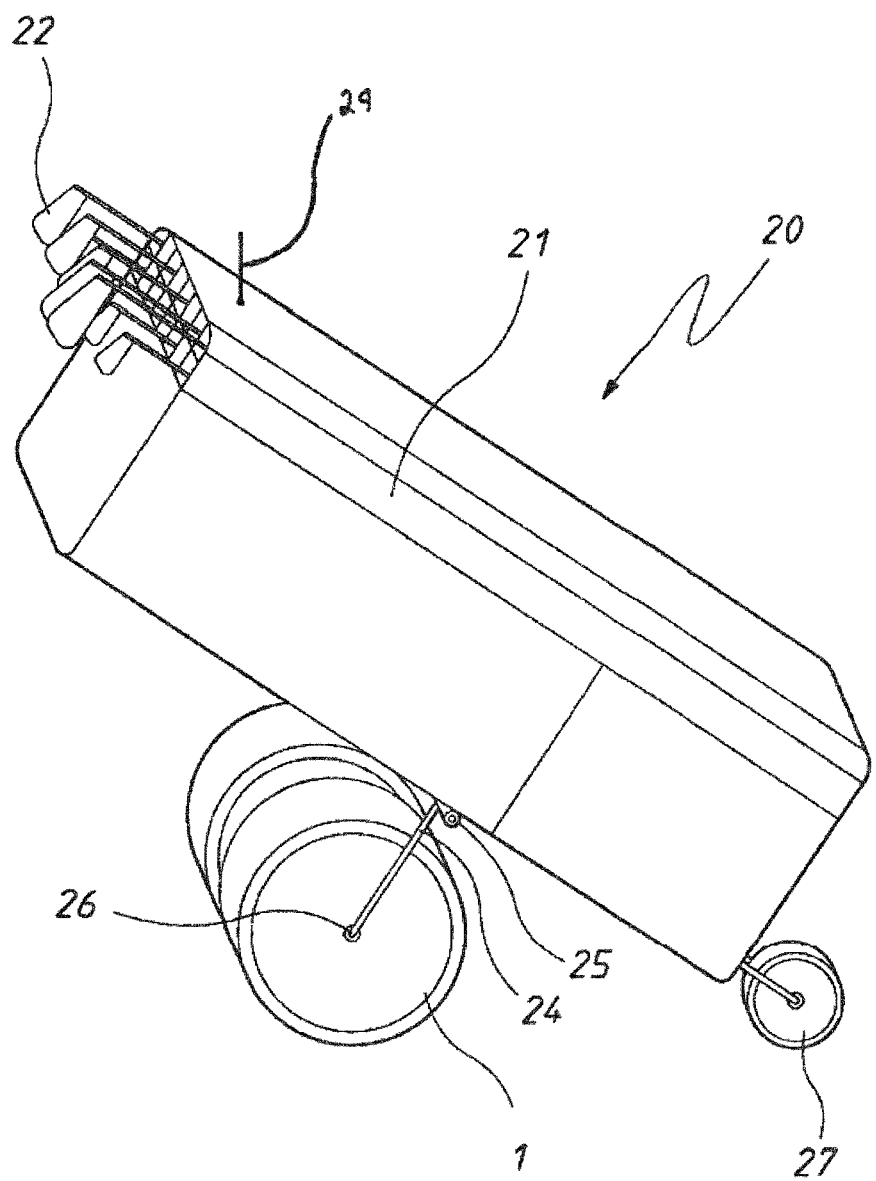
FIG. 13 is a perspective view of the golf club storage and transport device of FIG. 12 in an assembled configuration.

A pair of the wheels 1 are utilised in the device 20 shown in FIGS. 12 and 13. The illustrated embodiment is configured for the storage and transport of golf clubs 22. The device 20 includes a body 21 that is sized to receive a set of golf clubs 22, with each of the golf clubs being housable within a respective elongate compartment 28.

The pair of wheels 1 are releasably attachable to the body 21. In one embodiment the wheels are respectively attachable to a pair of axels 23 that are disposed on the base of the body 21. In this embodiment the wheels 1 are secured to the axels 23 by releasable fasteners, such as a pair of circlips, bolts, etc. In another embodiment each of the distal ends of the axels 23 feature a lug that is resiliently biased towards an outer position whereby each lug protrudes radially from the axel. Installation requires the wheel 1 to be pushed onto its axel, which pushes against the resilient biasing such that the lug assumes an inner position within the axel, which provides clearance for the wheel 1 to pass over the lug. Once the wheel is clear of the lug, the resilient biasing returns the lug to its outer position, which retains the wheel 1 in place. To remove the wheel 1 from the axel 23, it is merely necessary to push the lug into its inner position and then slide the wheel 1 from the axel 23.

The device 20 has an assembled configuration, as shown in FIG. 13, and a disassembled configuration, as shown in FIG. 12. In the assembled configuration the pair of wheels 1 are releasably attached to an arm 24 that is rotatably attached externally of the body 21. The arm 24 defines a proximal end 25 at which the arm 24 is rotatably attached to the body 21 and a distal end 26 at which the pair of wheels 1 is releasably attached. The arm 24 is rotatable relative to the body 21 between an extended position, as shown in FIG. 13, and a retracted position, as shown in FIG. 12. In one embodiment a detent retains the arm 24 in either the extended position or the retracted position. In another embodiment a lock retains the arm 24 in either the extended position or the retracted position. When in the extended position as shown in FIG. 13 the distal end 26 is spaced from the body 21 so as to provide sufficient clearance for the attached wheels 1 to rotate upon their axes without fouling against the body 21.

A freewheeling wheel 27 is rotatably attached to the body 21 at a position that is spaced apart from the axis of the two drivable wheels 1. Hence, when in the assembled configuration, the device 20 rests upon the three wheels and can be driven by the driving force provided by either or both of the drivable wheels 1. The freewheeling wheel 27 is rotatably mounted to the body 21 so as to swivel freely in any direction and hence it does not inhibit cornering or rotation of the device 20 in response to the two wheels 1 being driven at differing speeds.

When disassembling the device 20, the user firstly removes the two wheels 1 and then rotates the arm 24 into the retracted position whereby the distal end 26 is adjacent to the body 21. The wheels 1 are then housed as shown in FIG. 12 within the body 21. This helps to minimise the volume taken up by the disassembled device 20.

One embodiment of the device includes a braking mechanism for selectively applying a retardant force to at least one of the wheels 1 and/or 27. A brake lever is operable between 'stop' and 'go' positions. When the brake lever is in the 'stop' position, a portion of the brake mechanism is moved into frictional engagement with the wheel, thereby retarding or inhibiting rotation of the wheel. When the brake lever is in the 'go' position, the portion of the brake mechanism is released from the frictional engagement, thereby allowing the wheel to rotate.

An embodiment of the device 20 includes an antenna 29 for receipt of control signals sent from a remote control device. The antenna 29 is disposed on a top half of the device 20 to position it for optimum reception of the control signals. In one embodiment the antenna 29 is electrically connected via a wire to the electronic circuitry 8 of either or both of the wheels 1. In another embodiment the antenna is wirelessly connected to the electronic circuitry 8 of either or both of the wheels 1.

As noted above, each of the drivable wheels 1 includes its own electronic circuitry 8 for controlling its electric motor 16. In some autonomous embodiments, the electronic circuitry 8 of each of the wheels 1 includes a digital processor. Once a pair of wheels 1 are attached to the device 20, and once the electronic circuitry of each of the wheels 1 has been activated, a communications link is establish between the processors in each of the wheels 1. In one embodiment this communications link is via one or more wires that extend across the arm 24 between the wheels 1. In another embodiment this communications link is via wireless transmission and reception. In any event, once the communications link is established, the two processors execute a routine that defines one of the processors as the primary processor and the other as a secondary processor.

For the sake of providing an example below, we shall assume that the processor on the left hand side wheel 1 has been designated as the primary processor and the processor on the right hand side wheel 1 has been designated as the secondary processor. In this case the primary processor is responsible for providing the output signals to which the motor controller of the left hand wheel 1 is responsive. The secondary processor is responsible for providing the output signals to which the motor controller of the right hand wheel 1 is responsive. Additionally, the primary processor is tasked with performing the processing required to make high level decisions regarding the speed and direction along which the device 20 is to be driven. The primary processor then communicates instructions to the secondary processor regarding the driving performance that the primary processor requires of the wheel 1 upon which the secondary processor is disposed. The establishment of primary and secondary processors helps ensure that the two wheels 1 work harmoniously with each other to drive the device 20 in the desired direction (despite each of the wheels 1 having separate electronic control circuitry 8).

FIG. 14 depicts the method of controlling the motion of an autonomous motorised object having a pair of independently drivable wheels 1 as described above. Preferably the object is the device 20. The method commences at step S1 with the defining of a target position. In one embodiment the target position is defined as a geographically fixed position. In another embodiment the target position is defined with reference to a position specified on a mobile device being carried by a person. Some such examples from a golfing context will be described, however it will be appreciated that the method may be used in many other contexts, such as guiding the motion of an autonomous object within other locations and for other reasons, such as in hospitals, warehouses, businesses, homes, etc.

In one embodiment that is configured for use in a golfing context a golfer carries a mobile digital device, such as a mobile phone, a watch, a tablet, or the like, whilst playing. In the example described below the digital device is a mobile phone having a touch sensitive screen. An executable application is installed on the mobile phone which includes map data associated with the golfing course at which the golfer is playing. The map data shows the teeing ground 38, the fairway 30, the rough 31 and the putting green 39 for each of the holes of the golf course, as shown for example in FIGS. 15 and 16. The map data is correlated with GPS coordinates, such that the processor of the golfer's mobile phone can calculate the GPS coordinates of any position represented on the map. The golfer firstly makes an input on the touch sensitive screen to place the application in a mode in which the target position is to be defined. In response to this the mobile phone displays a map of the hole at which the player is currently playing. The golfer then touches the touch sensitive screen at a map position that corresponds to the geographically fixed position that the player desires to define as the target position 34. For example, the golfer may touch the map at a position close to a position to which the golf ball has just been hit. The golfer's mobile phone is configured to calculate the GPS coordinates associated with the selected target position 34 and these coordinates are communicated to the electronic circuitry of each of the wheels 1 across a communications link, such as a cellular data network, a WiFi link or a near field communications link such as Bluetooth. Once the target coordinates are received by the electronic circuitry 8 of each of the wheels 1, the coordinates defining the fixed target position 34 are stored in a random access memory location that is accessible to the primary processor.

Figure 16:
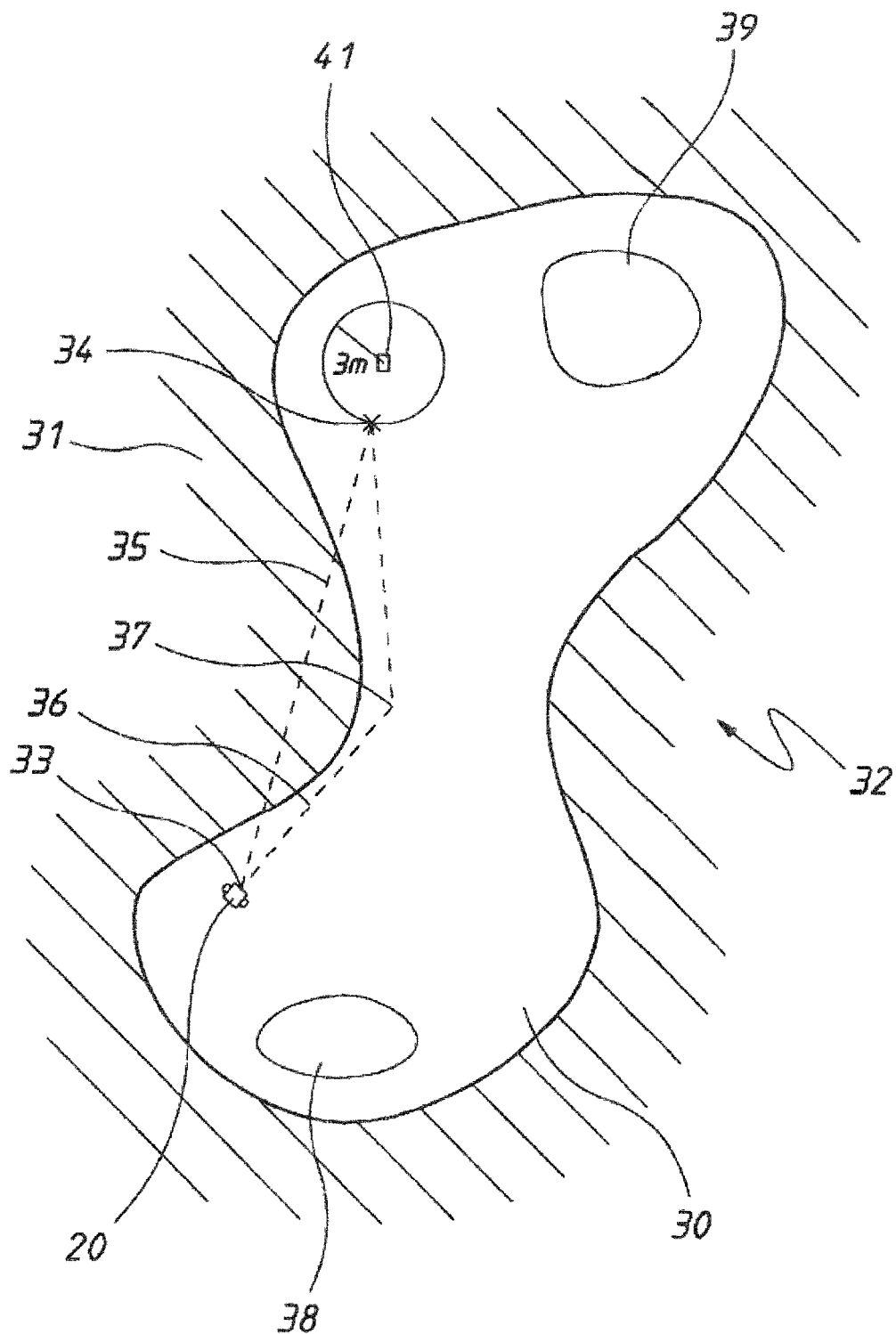

In another embodiment the target position is continually redefined with reference to a position sensed by a mobile device associated with the golfer (such as the golfer's mobile phone) as the golfer moves about the golf course. In other words, this allows the system to function with a moving target. This embodiment makes use of GPS positioning hardware in the golfer's mobile phone 41 that enables the golfer's mobile phone 41 to sense its current position. In this embodiment the golfer's mobile phone 41 runs an executable application that defines the target position with reference to the current position as sensed by the mobile phone's GPS hardware. More specifically, the target position is defined as a position that is a first predefined distance, for example 3 meters, from the position of the mobile device, as shown in FIG. 16. This results in the autonomous motorised device 20 being autonomously driven to a position that is approximately 3 meters from the golfer's current position (as sensed by the golfer's mobile phone). The mobile phone application is configured to repeatedly sense the phone's current position and communicate that position via the communications link for storage in the random access memory that is accessible to the primary processor.

At step S2 the primary processor polls the GPS positioning hardware provided upon its wheel 1 so as to sense the current position of the device 20, which is also stored in the random access memory that is accessible to the primary processor.

At step S3 the primary processor polls the digital compass provided upon its wheel 1, which senses data associated with a direction in which the device 20 is facing and the data associated with this direction is stored in the primary processor's random access memory.

Figure 15:
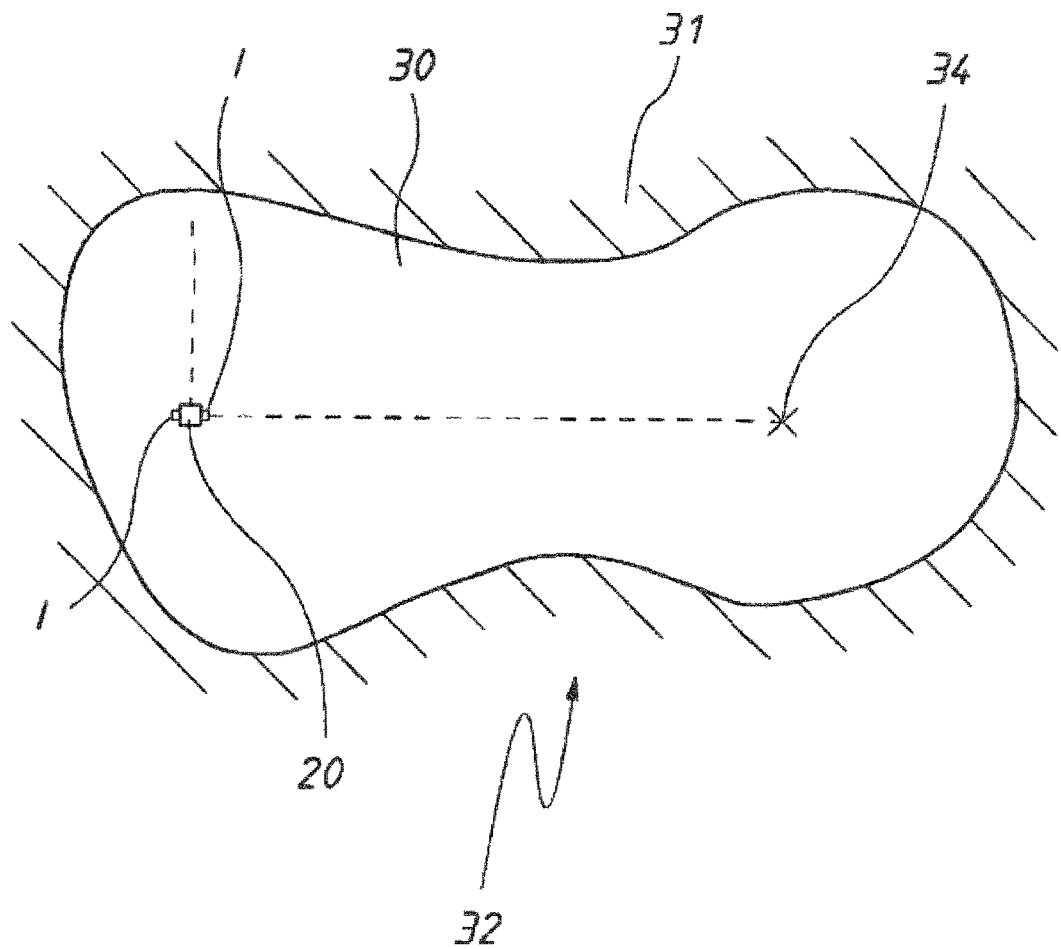

At step S4 the primary processor computes the angle between the direction the device 20 is currently facing (as sensed by the digital compass) and the direction of a line extending from the device's current position to the target position. For the sake of an example, we shall assume that the device 20 is currently facing due north; however the direction from the device's current position to the target position is due east, as shown in FIG. 15. In this example, the primary processor calculates that the object must rotate by 90° to the right in order to face directly toward the target position 34.

At step S5 the primary processor (i.e. the processor disposed on the left wheel 1) provides an output instructing the left hand motor controller to drive the left hand electric motor 16 forwards at a speed of, say, 3 kilometers per hour. Substantially simultaneously, the primary processor communicates instructions to the secondary processor (i.e. the processor disposed on the right wheel 1) requesting that the right hand wheel be driven backwards at 3 kilometers per hour. In response to receipt of this communication, the secondary processor provides an output instructing the right hand motor controller to drive the right hand electric motor 16 rearwards. This causes the device 20 to rotate to the right.

At step S6, whilst the device is rotating to the right, the primary processor repeatedly polls the digital compass disposed on the left hand wheel 1 so as to calculate the angle between the direction the device 20 is currently facing (as sensed by the digital compass) and the direction of a line extending from the device's current position to the target position.

At loop limiting step S7 the primary processor checks if the angle as calculated in the previous step is equal to zero (to within acceptable tolerances), which indicates that the device 20 is facing directly toward the target position. If not, the process flow loops back to step S5 and rotation of the device 20 is continued. However, if the angle is equal to zero, the process flow proceeds to step S8 at which the primary processor provides an output to its motor controller halting rotation of the left wheel 1. Substantially simultaneously the primary processor sends instructions to the secondary processor to halt rotation of the right hand wheel 1. In response to receipt of this communication, the secondary processor provides an output to its motor controller stopping the rotation of the right hand wheel 1.

At step S9 the primary processor provides an output to the left hand motor controller to drive the left hand wheel 1 forwards at, say, 5 kilometers per hour. Substantially simultaneously, the primary processor sends a communication instructing the secondary processor to provide an output to its motor controller to drive the right hand wheel 1 forwards at an identical rotational speed of 5 kilometers per hour with the aim of driving the device 20 directly toward the target position.

Whist driving the each of the wheels 1 at a desired speed of 5 kilometers per hour at step S9, the primary processor regularly polls the rotational speed sensor of the left hand wheel and compares the measured rotational speed to the desired rotational speed. This is used by the primary processor in a feedback loop to make refinements to the output that is provided from the primary processor to the left hand motor controller so as to maintain the left hand wheel's rotational speed as desired. Similarly, the secondary processor regularly polls the right hand rotational speed sensor and compares the measured rotational speed to the desired rotational speed. This is used by the secondary processor in a feedback loop to make refinements to the output that is provided from the secondary processor to the right hand motor controller so as to maintain the right hand wheel's rotational speed as desired.

As an alternative to monitoring the rotational speed of the wheels 1, another embodiment makes use of a torque differential between the pair of wheels 1 so as to control the direction of motion of the device 20. This embodiment makes use of a pair of sensors that respectively measure the torque applied to each of the wheels 1. In this embodiment the measured torque values are communicated to the primary and secondary processors as a part of a feedback control loop that aims to control the driving of the wheels 1 in a manner that is similar to that described above.

As the device 20 moves, the primary processor loops through steps S10, S11, S12 and S13 to provide a feedback control loop. At step S10 the primary processor polls both its GPS hardware and its digital compass so as to ascertain the device's actual current position and direction.

At step S11 the primary processor compares the actual current position and direction of the device to the intended position and direction as stored in the random access memory previously by the primary processor.

At step S12 the primary processor uses the data determined in step S11 in a feedback loop process to refine the output that it is providing to the motor controller of the left hand wheel 1. The primary processor may also use the data to refine the instructions that it is communicating to the secondary processor to control the driving of the right hand wheel 1. For example, if the primary processor determined at step S11 that the device's direction of motion is diverging to the right from the intended direction of travel, the primary processor causes a rotational speed differential between the pair of wheels 1 so as to control the direction of motion of the device 20. In this example, the primary processor provides an output to its motor controller to slightly slow the rotation of the left hand wheel as compared to the speed of rotation that the primary controller had instructed the secondary processor to maintain for the right hand wheel 1. This rotational speed differential between the two driven wheels 1 progressively swings the direction of motion of the device 20 back towards the left (i.e. back towards the intended direction of travel).

If the target position was defined as a geographically fixed position, then it would generally be anticipated that the refinements that are implemented at step S12 may be minimal. However, if the target position was defined as a fixed distance from the current position of a mobile phone that is being held by a person who is walking around (i.e. if the target position is constantly or intermittently shifting), then the refinements at step S12 are likely to be more substantial.

At step S13 the primary processor calculates the distance between the device's current position as sensed by the GPS hardware of the left hand wheel 1 and the target position as stored in the random access memory that is accessible to the primary processor. At loop limiting step S14 the primary processor checks if this yields a positive non-zero value. If so, the primary processor concludes that the device 20 has not yet reached the target position and the process flow loops back to step S9. On the other hand, once this calculation yields a value substantially equal to zero to within acceptable tolerances, the primary processor concludes that the device 20 has arrived at the target position and the process flow proceeds to step S15.

At step S15 the primary processor provides an output to the left hand motor controller to stop the motion of the left wheel 1. Substantially simultaneously, the primary processor communicates instructions to cause the secondary processor to provide an output to the right hand side motor controller so as to stop motion of the right hand wheel 1. The device 20 has now been autonomously driven to, and stopped at, the target position. For the embodiment in which the target position is a geographically fixed position, the process flow now loops back to step S1 to allow for a new target position to be defined. However, for the embodiment that functions with a moving target (that is, the embodiment in which the target is defined as a first predefined distance, such as three meters, from a position sensed by a mobile device), once the processor determines that the current position of the device 20 is at or within 3 meters from the mobile device, the primary processor is configured to halt all driving of the wheels 1 of the device 20 until it is determined as described below that driving of the device 20 should recommence.

At step S16 the primary processor polls both the current position of the device 20 from the GPS unit on the left hand wheel 1 and the current position of the golfer's mobile phone from the mobile phone's GPS functionality. This allows the primary processor to calculate the distance between the current position of the device 20 and the mobile device. At step S17 the primary processor determines if this distance remains below a second predefined distance, which in the preferred embodiment is 4 meters. If so, the primary processor continues to halt all driving of the wheels 1 of the device 20 and the process flow loops back to step S16. However, once the distance exceeds 4 meters, the primary processor defines a new target position, which is the first predefined distance (i.e. 3 meters) from the mobile phone 41, and the process flow the loops back to step S2 such that the device 20 will be driven to the new target position. Because the second predefined distance (i.e. 4 meters) is greater than the first predefined distance (i.e. 3 meters), this allows the device 20 to stop completely once it is within 3 meters from the golfer's mobile phone 41. This avoids the device 20 from constantly attempting to re-position itself as the golfer makes small movements whilst the device 20 is within the 4 meter radius. Rather, movement of the device 20 is only re-initiated once the golfer's phone 41 is at least 4 meters from the device 20.

In the above-described method, the primary processor essentially routed the device 20 in a straight line toward the target position 34. However, in another golfing-related embodiment the primary processor executes an additional step to ensure that the route 36 stays on the fairway 30 and does not impinge upon the rough 31. When planning the route 36 upon which to drive the device 20, the primary processor accesses the map data defining the golf course hole 32 upon which the golfer is playing, which includes information defining the fairway 30 and the rough 31 of the golf course hole 32. As shown schematically in FIG. 16, the primary processor initially plots a direct line 35 from the device's initial position 33 to the target position 34 (of course, this does not necessarily involve plotting an actual line on a visible map—it may take place solely within the logic of the primary processor). The primary processor then conducts a routine to check if the direct line 35 would impinge upon the rough 31. This involves calculating a plurality of positions along the direct line 35 using small increments, such as 5 centimeters, from the starting position. The primary processor accesses the map data to check whether each of these positions is on the fairway 30 or in the rough 31. If all of these positions are on the fairway 30, then the direct line 35 is adopted as the route upon which to drive the device 20. However, if as shown for example, in FIG. 16, the direct line 35 would impinge upon the rough 31, then the primary processor is configured to explore options for planning an alternative route that would keep the device 20 on the fairway 30 for the whole journey from the starting position 33 to the target position 34. This involves proposing and checking a plurality of alternative possible routes until a route 36 is determined that connects the starting position 33 and the target position 34 via the fairway 30 without impinging upon the rough 31. As shown in FIG. 16, an example of an alternative route 36 requires the device 20 to be driven a first distance in a first direction that is angled to the right of the direct line 35. Once the primary processor determines that the device 20 has reached way point 37, the primary processor causes the device 20 to rotate to through an angle to the left to face a second direction that faces directly toward the target position 34. The device 20 is then driven a second distance in the second direction until the target position 34 is reached. This allows the golfer the freedom to wander into the rough 31 without the device 20 attempting to follow the golfer into the rough 31. This avoids the likelihood that the device 20 may get stuck if it attempts to venture into the rough 31.

Figure 17:
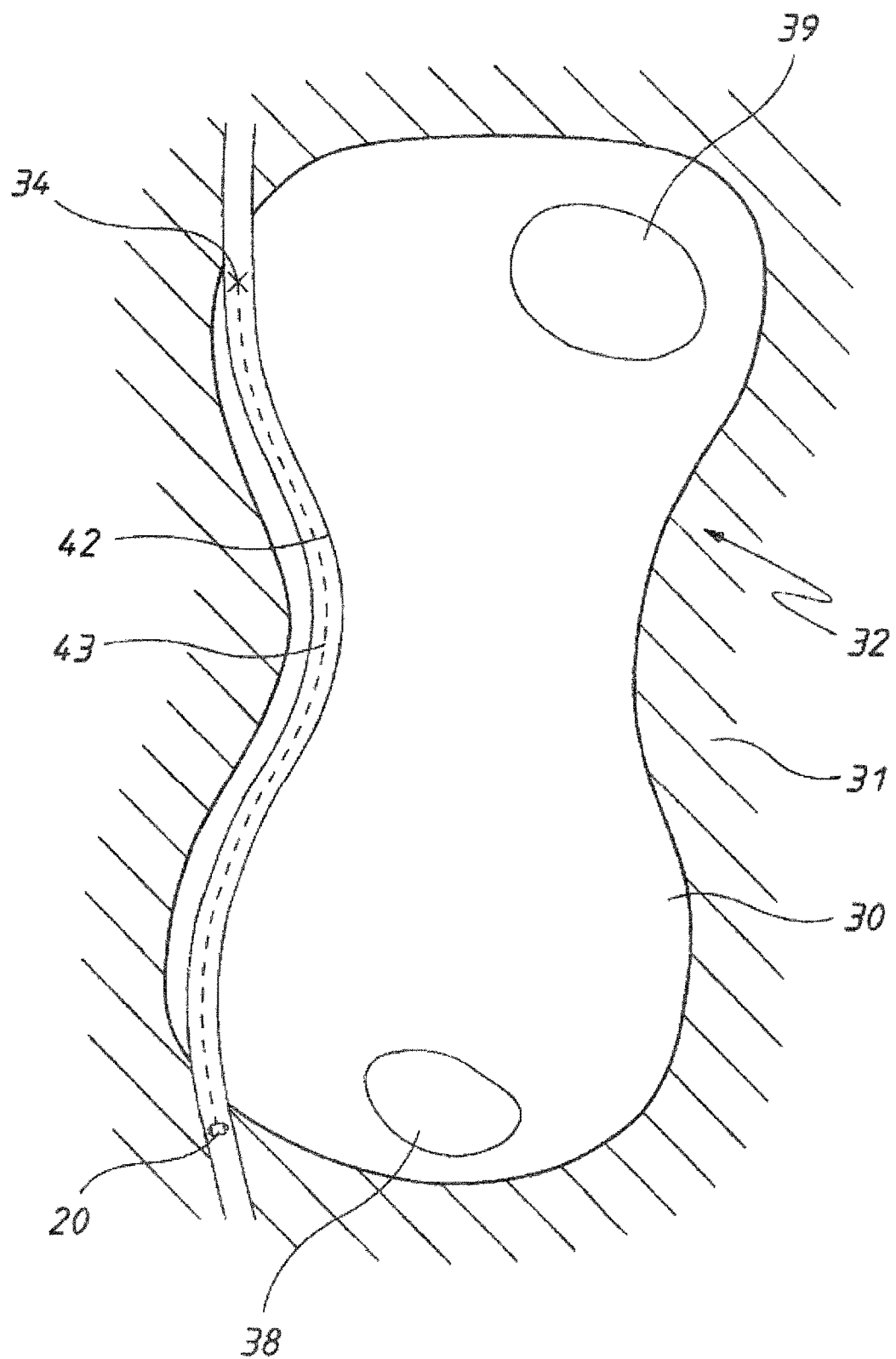

Another embodiment of the method is configured for use at a venue, such as a golf course for example, having a pre-existing pathway 42 along which the device 20 may be driven. An example of such an arrangement is shown in FIG. 17. In this embodiment the pathway 42 is shown on the map data that is viewable on the player's hand held mobile device. In the illustrated example we shall assume that the golfer has hit a golf ball from the teeing ground 38 to a spot close to the putting green. After making the shot, the golfer puts his or her mobile device in a mode allowing for the definition of the target position and a representation of the map data for the current hole is displayed on the touch sensitive display of the golfer's hand held mobile device. The golfer then touches the touch sensitive screen at a position on the pathway 42 to which he or she wants the device 20 to be driven, which would typically be close to the position at which the golfer will be taking her or her next shot. This defines the target position 34 in the memory of the golfer's mobile device. The executable application that is installed on the golfer's mobile device then plots a route 43 along the pathway 42 extending from the current position of the device 20 to the target position. The plotting of the route 43 is done by calculating a plurality of GPS coordinates, each of which lies on the pathway 42 and which extend in short increments, such as 1 cm, from the current position of the device 20 to the target position 34. This plurality of GPS coordinates shall be referred to as the "route data". In some embodiments the route 43 is displayed upon the map that is depicted on the player's hand held mobile device. In other embodiments the route data is merely stored in the random access memory of the golfer's mobile device. Once the route data has been determined, it is communicated from the golfer's mobile device to the primary processor via the communications link.

Once received, the route data is stored in the random access memory that is accessible to the primary processor. In one embodiment the primary processor then processes the route data to approximate the route 43 using a plurality of straight line segments. In this embodiment the primary processor drives the device 20 along each of the straight line segments in the manner described in detail above. At the end of each of the straight line segments, the primary processor causes the device 20 to rotate through whatever angle is required for the device to face towards the next of the straight line segments. Once again, the details of such rotation were described in detail above.

In an alternative embodiment, the primary processor processes the route data to approximate the route 43 using a plurality of curved and/or straight segments. To drive the device through the straight segments, the primary processor uses the method as described above. To drive the device through a curved segment, the primary processor calculates the radius of curvature of the curved segment. For the sake of an example, we shall assume that the segment curves to the right, has a radius of curvature of 50 meters and it subtends an angle of 45°. The primary processor now calculates the individual radiuses that are to be travelled by the left hand wheel 1 and the right hand wheel 1 if the centre of the device 20 is to scribe the 50 meter arc. This requires the primary processor to be aware of the wheel track (i.e. the distance between the centre lines of each of the drivable wheels 1). In the preferred embodiment the wheel track is 320 mm and this constant value is stored in the memory that is accessible to the primary processor. The primary processor then halves the wheel track to yield 160 mm and this amount is added to 50 meters to yield a radius of 50.16 meters, which is the radius that is to be scribed by the left drivable wheel 1. 160 mm is also subtracted from 50 meters to yield a radius of 49.84 meters, which is the radius that is to be scribed by the right drivable wheel 1. The ratio of these radiuses is equal to the ratio of the required left and right wheel speeds. The ratio of the radiuses is approximately 1.00642. If the right hand wheel 1 is to travel at 5 kilometers per hour, then the primary processor calculates that the left hand wheel is to travel at 5×1.00642=5.0321 kilometers per hour. Hence, the primary processor provides an output to the motor controller of the left hand wheel 1 to cause the left hand wheel 1 to be driven forwards at a speed of 5.0321 kilometers per hour. Substantially simultaneously, the primary processor sends a communication instructing the secondary processor to provide an output to its motor controller to drive the right hand wheel 1 forwards at speed of 5 kilometers per hour. This speed differential between the left and right hand wheels 1 should cause the device to scribe the arc of the curved segment. As the device 20 proceeds through the arc, the sensors in the wheels 1 provide inputs to allow the primary processor to use a feedback loop to refine the driving speeds of the two wheels to correct for any deviations that the device 20 may be taking from the desired route 43. Once the primary processor determines from inputs from the wheel's position sensors that the device has travelled the full length of the curved segment, the primary processor moves onto the processing required for the next curved or straight segment in the route 43.

Figure 18:
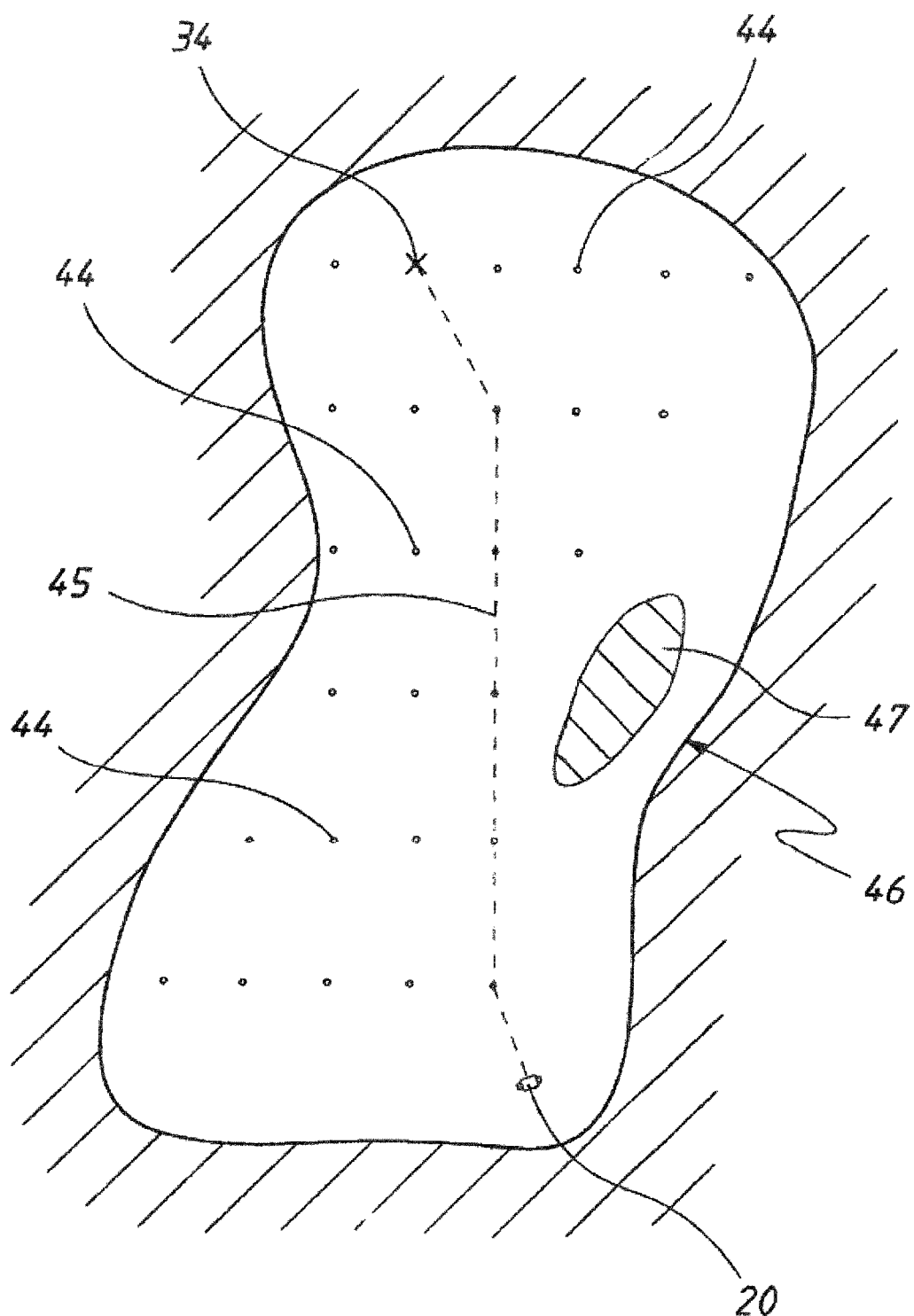

In yet another embodiment of the method the primary processor is responsive to user inputs that define the route 45. In this embodiment, the golfer's mobile device is configured to display the map data of the current golf course hole and to overlay the map data with a plurality of user selectable pre-defined waypoints 44, as illustrated in FIG. 18. The golfer then puts the mobile device into route-setting mode and touches the touch sensitive screen at each of the waypoints 44 that lie on the route 45 that the golfer requires the device 20 to take. The waypoints 44 are pre-defined so as to avoid any known potential problem areas on the golf course. For example, the golf course hole 46 illustrated in FIG. 8 includes a sand trap 47 and hence no waypoints 44 are defined in the regions adjacent to that sand trap 47. Other examples of potential problem areas close to which waypoints 44 are to be avoided include muddy puddles, steep inclines, etc. Once the golfer has defined the route 45 in this manner, the golfer makes a suitable input into the mobile device to confirm that the route 45 has been finalised and then the mobile device calculates the GPS coordinates that correspond to the selected waypoints 44 and communicates them via the communications link to the primary processor. Upon receipt, the primary processor uses the methods outlined above to cause the device 20 to be driven along the route 45.

As an alternative to making use of the touch sensitive screen of the mobile device to select the waypoints 44 to define the route 45, another embodiment makes use of voice recognition software that is executed on the mobile device to do so. In this embodiment, each of the predefined waypoints 44 is given an individual identification code. With reference to the waypoints shown in FIG. 18, these identification codes are A1 for the lower left hand waypoint 44, through to A5 for the lower right hand side waypoint 44. The waypoints 44 in the next row above are identified as B1 through to B4, and so on. Hence, to define the route 45 as shown in FIG. 18, the golfer would firstly put his or her mobile device into route-setting mode. Then the golfer verbally states the route in the following terms: "A5, B4, C3, D3, E3, F2." The sound waves generated by the golfer are received by a microphone on the mobile device and an electrical signal representative of the sound wave is communicated to the processor of the mobile device, which executes a voice recognition routine to extract the route data from the sound wave signal. The mobile device then calculates the GPS coordinates that correspond to the verbally selected waypoints 44 and communicates them via the communications link to the primary processor in the manner outlined in the preceding paragraph.

An embodiment of the invention allows the user to remotely halt the motion of the device 20. In this embodiment, a user input screen is depicted on the user's mobile device whilst the device 20 is in motion. This user input screen includes a "STOP" region as depicted on the touch sensitive display. If the user touches this region, the mobile device sends a stop message via the communications link to the device 20. Upon receipt of the stop message, the primary processor halts the driving of the left hand wheel 1 and substantially simultaneously sends a message instructing the secondary processor to halt the driving of the right hand wheel 1.

In the above described embodiments, each of the driven wheels includes its own electronic circuitry 8 for controlling its electric motor 16, with one being designated a role as a primary processor and the other being designated a role as a secondary processor. However, an alternative embodiment of the device utilises a single set of control circuitry to control the speed of rotation of each of the driven wheels.

Another embodiment utilises an autonomous directional control strategy that is not based on GPS technology. Rather, the target is defined by a mobile transmitter, which transmits a signal that reduces progressively in intensity as the signal propagates away from the transmitter. Examples of suitable signals include radio and microwave signals. The device 70 has a pair of antennas, one of which is positioned on the left hand side of the device 70 and the other of which is positioned on the right hand side of the device 70. The control circuitry for each of the driven wheels calculates the intensity of the signal that was received on its associated antenna and these intensities are compared. If they are equal, the control circuitry interprets this as indicating that the device 70 is facing towards the target as defined by the transmitter. However, if the intensity of the signal received on one side exceeds the intensity of the signal received on the other side, then the control circuitry causes the device 70 to turn towards the side having the higher intensity. For example, if the intensity as received by the right hand antenna is lower than the intensity as received by the left hand antenna, then the control circuitry would increase the rotational speed of the right hand wheel, (and/or reduce the speed of the left hand wheel) causing the device to turn to the left hand side. This continues until the signal intensities are equal. Once equal, the control circuitry then causes the device to continue in a straight line towards the target.

In the embodiment described in the preceding paragraph, the transmitter would typically be disposed on a person, who may be moving around a venue such as a golf course, for example. In such a circumstance it is generally advantageous to avoid the device 70 being driven all the way to the target, because this is likely to cause the device to hit the person. This issue is addressed by defining a stop radius of, say, a couple of meters, around the transmitter. The signal intensity at the stop radius is measured and stored in the memory of the device's control circuitry. As the device 70 is driven towards the target, the device's control circuitry repeatedly measures the signal intensity as currently received in both of the antennas. These values are compared to the stored value for the signal intensity at the stop radius. Once either, or both, of the signal intensities are equal to, or in excess of, the stored value for the signal intensity at the stop radius, this is construed by the device's control circuitry as indicating that the device has reached the stop radius, at which point the device's control circuitry halts the movement of the device 70. This allows the person to safely approach the device. Movement of the device 70 will not recommence until the device's control circuitry determines that the intensity as measured in either or both of the antennas has dropped below the stored value for the signal intensity at the stop radius.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

The claims defining the invention are as follows:

1. A golf club storage and transport device including:
    a body sized to receive a plurality of golf clubs, the body having at least one storage compartment disposed on a bottom half thereof; and
    at least a pair of modular wheel assemblies, each being releasably attachable to the body and each of the modular wheel assemblies including: an arm defining a proximal end configured to attach to the body and a distal end having an axle projecting therefrom; a wheel being rotatably mountable to the axle; a port releasably connected to a power supply; an electric motor disposed upon the arm, the electric motor being driveably coupleable to the wheel; and a motor controller disposed upon the arm, the motor controller being configured to cooperate with a like motor controller of a like modular wheel assembly to control rotation of the electric motor and to cause a rotational speed differential between the wheel and a wheel of the like modular wheel assembly to control the motion of the body to which the modular wheel assemblies are releasably attachable;
    the modular wheel assemblies being configured to render the body mobile, without requiring the body to house any components associated with propulsion, power or control;
    the device having an assembled configuration in which the modular wheel assemblies are attached externally to the body to support the body and a disassembled configuration in which the modular wheel assemblies are detached and are storable upon a top half of the body or in the at least one storage compartment.

2. The golf club storage and transport device according to claim 1, wherein the proximal ends of the arms of the modular wheel assemblies are each rotatably attachable to the body, each arm being rotatable between an extended position in which the distal end of the arm is spaced from the body to provide clearance allowing the wheel to rotate upon the axle without fouling against the body and a retracted position in which the distal end of the arm is adjacent to the body when the wheel is detached from the axle.

3. The golf club storage and transport device according to claim 1, including at least one freewheeling wheel rotatably attached to the body.

4. The golf club storage and transport device according to claim 3, wherein an attachment formation attaching said freewheeling wheel to the body is configurable between an extendible position in which the freewheeling wheel is spaced from the body and a retracted position in which the freewheeling wheel is housed within, or adjacent to, the body.

5. The golf club storage and transport device according to claim 4, wherein the freewheeling wheel, whilst in the retracted position, protrudes from the body to rollingly engage with the ground when transporting the device whilst the device is in the disassembled configuration.

6. The golf club storage and transport device according to claim 1, wherein the body defines an array of elongate storage compartments, each being sized to receive a handle and a shaft of a golf club.

7. The golf club storage and transport device according to claim 1, including a braking mechanism configured to selectively apply a retardant force to at least one of the wheels.

8. The golf club storage and transport device according to claim 1, including an antenna configured to receive control signals, the antenna being disposed on the top half of the device.

* * * * *